United States Patent
Tennies et al.

(10) Patent No.: US 12,542,948 B2
(45) Date of Patent: Feb. 3, 2026

(54) SYSTEM AND METHOD FOR LIVE VIDEO STREAMING BASED ON PROXIMITY

(71) Applicants: Jason Tennies, Port Washington, WI (US); Travis Mergener, Slinger, WI (US)

(72) Inventors: Jason Tennies, Port Washington, WI (US); Travis Mergener, Slinger, WI (US)

( * ) Notice: Subject to any disclaimer, the term of this patent is extended or adjusted under 35 U.S.C. 154(b) by 18 days.

(21) Appl. No.: 18/543,314

(22) Filed: Dec. 18, 2023

(65) Prior Publication Data

US 2024/0205500 A1    Jun. 20, 2024

Related U.S. Application Data

(60) Provisional application No. 63/387,967, filed on Dec. 18, 2022.

(51) Int. Cl.
| | |
|---|---|
| *H04N 21/442* | (2011.01) |
| *H04N 21/2187* | (2011.01) |
| *H04N 21/436* | (2011.01) |

(52) U.S. Cl.
CPC ... *H04N 21/44227* (2013.01); *H04N 21/2187* (2013.01); *H04N 21/436* (2013.01)

(58) Field of Classification Search
CPC ............. H04N 21/2187; H04N 21/436; H04N 21/4223; H04N 21/44227
See application file for complete search history.

(56) References Cited

U.S. PATENT DOCUMENTS

| | | | |
|---|---|---|---|
| 10,086,761 B2 | 10/2018 | Kröll et al. | |
| 2009/0275285 A1* | 11/2009 | Maricevic | ............... H04B 7/00 |
| 2019/0199725 A1* | 6/2019 | Pularikkal | ............... H04L 63/10 |
| 2020/0117755 A1* | 4/2020 | Plant | ...................... H04N 7/181 |
| 2023/0300560 A1* | 9/2023 | Chandrasekaran et al. | .................. |
| | | | H04W 4/021 |

FOREIGN PATENT DOCUMENTS

| | | | | |
|---|---|---|---|---|
| KR | 20160060018 A | * | 5/2016 | ............... H04N 7/18 |
| WO | WO-2013083868 A1 | * | 6/2013 | ............. H04B 17/00 |

* cited by examiner

*Primary Examiner* — Anthony Bantamoi
(74) *Attorney, Agent, or Firm* — Ziolkowski Patent Solutions Group, SC

(57) ABSTRACT

A video streaming system includes a camera configured to capture a live video and a video streaming device configured to broadcast a wireless network, receive the live video, and transmit a live video feed including the live video over the wireless network. The video streaming system also includes a control system configured to receive a request to connect to the wireless network from a mobile device in range of the wireless network; identify the mobile device and/or a user of the mobile device; upon identifying the mobile device and/or the user, determine whether the mobile device and/or the user is authorized to connect to the wireless network; and upon determining that the mobile device and/or the user is authorized to connect to the wireless network, instruct the video streaming device to connect the mobile device to the wireless network and transmit the live video feed to the mobile device.

20 Claims, 15 Drawing Sheets

SYSTEM AND METHOD FOR LIVE VIDEO STREAMING BASED ON PROXIMITY

CROSS-REFERENCE TO RELATED APPLICATIONS

The present application claims the benefit of U.S. Provisional Patent Application Ser. No. 63/387,967 filed Dec. 18, 2022, the disclosure of which is incorporated herein by reference in its entirety.

BACKGROUND OF THE INVENTION

Embodiments of the present invention relate to a video streaming system and, more particularly, to a system and method for streaming a live video feed based on proximity.

Operators or drivers of various commercial or industrial vehicles or equipment, such as, for example, farming equipment, dump trucks, dump trailers, and flatbed trailers, need to load goods into their vehicles in different loading operations. Such loading operations may include loading a dump truck from a mill, loading trailers with corn or grain from a combine, and loading materials into a trailer with a crane, as non-limiting examples. During any of these loading operations, the drivers may have little or no control over how the goods are being loaded into their vehicles. In fact, they may not even be able to see the goods during the loading operation.

As a non-limiting example, one type of loading operation involves loading a dump truck with asphalt from a mill. In this type of loading operation, the dump truck driver typically relies on markers on the mill to determine if the dump truck is in the correct position. For example, flags may extend out from the mill with the intent that the dump truck driver drive between the flags. Once the driver is in between the flags the driver will move forward so that the mill operator can fill the bed of the truck from the front to the back without having to make major adjustments to the mill.

However, the dump truck driver is not able to see the bed of the dump truck. Thus, the driver cannot observe how the asphalt is being distributed in the dump truck bed by the mill operator and will not know whether the mill operator evenly distributed the asphalt over the bed or whether the mill operator provided the dump truck with a full load to deliver. Further, the dump truck driver may not even be able to see if all of the asphalt is being loaded into the bed or if some or all of the asphalt is missing the bed and falling to the ground. Without seeing the goods or the distribution of the goods, the driver will not know when to make a course correction to improve the efficiency of the loading operation.

In above example loading operation and in loading operations in general, when drivers are unable to view the loading operation leads to a decrease in safety, efficiency, and productivity. In the above example, the mill operator may improperly load the dump truck with an uneven weight distribution over the rear axle of the dump truck, which would be dangerous for the driver. Moreover, if some or all of the asphalt is missing the dump truck bed at any point during the loading operation, the asphalt may cause damage to the exterior to of the dump truck, to another dump truck waiting to receive a load, or to other nearby property. In that case, the efficiency and productivity of the loading operation would also suffer because the dump truck will take longer to fill or will not receive as much asphalt to deliver.

These considerations are extendable to any similar loading operations during which the driver is unable to see the loading of the goods. In general, such loading operations will have reduced safety, efficiency, and productivity. Different methods for allowing the driver to see the loading operation have been unsuccessful. For example, mounting a camera on a dump truck that allowed a driver to see the bed resulted in destruction of the camera when the goods struck the camera during a loading operation.

It would therefore be desirable to provide a system and method that allows for vehicle or equipment operators to view the goods and the distribution of the goods in their vehicles during a loading operation in order to increase the safety, efficiency, and productivity associated with the loading operation.

BRIEF STATEMENT OF THE INVENTION

In accordance with one aspect of the invention, a video streaming system includes a first camera configured to capture a live video. The video streaming system also includes a video streaming device having one or more transmitters, one or more receivers, and/or one or more transceivers. The video streaming device is configured to broadcast, via at least one transmitter of the one or more transmitters and/or at least one transceiver of the one or more transceivers, a wireless network; receive the live video captured by the first camera; and transmit, via at least one transmitter of the one or more transmitters and/or at least one transceiver of the one or more transceivers, a live video feed over the wireless network. The live video feed includes the live video captured by the first camera. The video streaming system additionally includes a control system having one processor configured to individually perform control system functions or a plurality of processors configured to individually and/or collectively perform control system functions. The control system is configured to receive, from a first mobile device in range of the wireless network, a first request to connect to the wireless network; identify the first mobile device and/or a user of the first mobile device based on the first request; and upon identifying the first mobile device and/or the user of the first mobile device, determine whether the first mobile device and/or the user of the first mobile device is authorized to connect to the wireless network. The control system is further configured to, upon determining that the first mobile device and/or the user of the first mobile device is authorized to connect to the wireless network, instruct the video streaming device to connect the first mobile device to the wireless network and transmit, via at least one transmitter of the one or more transmitters and/or at least one transceiver of the one or more transceivers, the live video feed to the first mobile device.

In accordance with another aspect of the invention, a method of transmitting a live video feed via a video streaming system includes capturing live video via at least one camera and broadcasting a wireless network via at least one transmitter of one or more transmitters and/or at least one transceiver of one or more transceivers of a video streaming device. The method also includes receiving, at a control system comprising one processor configured to individually perform control system functions or a plurality of processors configured to individually and/or collectively perform control system functions, a first request to connect to the wireless network from a first mobile device in range of the wireless network. In addition, the method includes identifying, via the control system, the first mobile device and/or a user of the first mobile device based on the first request and, upon identifying the first mobile device and/or the user of the first mobile device, determining, via the control system, whether the first mobile device and/or the user of the first mobile device is authorized to connect to the wireless network. Furthermore, the method includes, upon determining that the first mobile device and/or the user of the first mobile device is authorized to connect to the wireless network, instructing, via the control system, the video streaming device to connect the first mobile device to the wireless network and transmit, via at least one transmitter of the one or more transmitters and/or at least one transceiver of the one or more transceivers, a live video feed comprising the live video captured by the at least one camera to the first mobile device.

In accordance with yet another aspect of the invention, a control system for a video streaming system includes one processor configured to individually perform control system functions or a plurality of processors configured to individually and/or collectively perform control system functions. The control system is configured to receive a first request to connect to the wireless network from a first mobile device in range of a wireless network broadcast by a video streaming device of the video streaming system; identify the first mobile device and/or a user of the first mobile device based on the first request; upon identifying the first mobile device and/or the user of the first mobile device, determine whether the first mobile device and/or the user of the first mobile device is authorized to connect to the wireless network; and upon determining that the first mobile device and/or the user of the first mobile device is authorized to connect to the wireless network, instruct the video streaming device to connect the first mobile device to the wireless network and transmit a live video feed to the first mobile device, the live video feed comprising live video from at least one camera of the video streaming system.

These and various other features and advantages of the present invention will be more readily understood from the following detailed description and the accompanying drawings.

BRIEF DESCRIPTION OF THE DRAWINGS

The drawings illustrate embodiments presently contemplated for carrying out the invention.

In the drawings.

DETAILED DESCRIPTION

While embodiments of the invention are described herein with reference mainly to dump trucks, those with skill in the art will understand that the concepts disclosed herein may be used with other vehicles such as dump trailers and flatbed trailers, as non-limiting examples.

Figure 1:
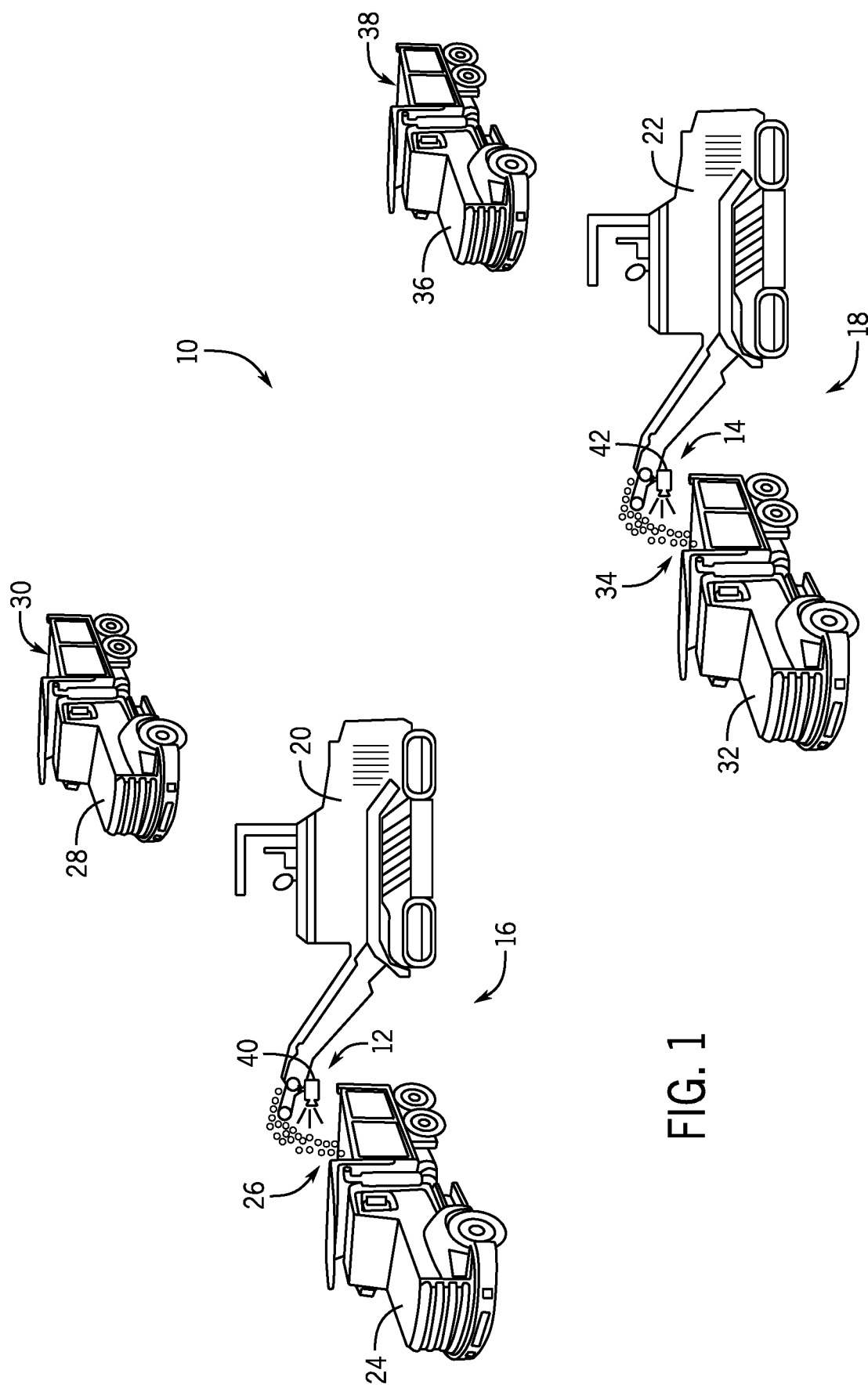
FIG. 1 is a perspective view of a milling operation using one or more video streaming systems, according to an embodiment of the invention.

Referring now to FIG. 1, a perspective view of a milling operation 10 using video streaming systems 12, 14 is shown, according to an embodiment of the invention. While video streaming system 12, 14 are described below as separate video streaming systems 12, 14 operating together, video streaming systems 12, 14 may also be considered to be two components of a single video streaming system. Further, video streaming systems 12, 14 are generally capable of including the same components and operating in the same manner. Thus, any description of one of video streaming systems 12, 14 is generally applicable to the other of video streaming systems 12, 14 as well.

Milling operation 10 includes first and second milling locations 16, 18 at which respective first and second mills 20, 22 are operating. First mill 20 includes video streaming system 12 and is loading a first dump truck 24 having a bed 26 while a second dump truck 28 having a bed 30 is waiting for first mill 20 to finish loading bed 26 of first dump truck 24. Second mill 22 includes video streaming system 14 and is loading a third dump truck 32 having a bed 34 while a fourth dump truck 36 is waiting for second mill 22 to finish loading bed 34 of third dump truck 32.

Video streaming systems 12, 14 operate to allow the drivers of dump trucks 24, 28, 32, 36 to view how mills 20, 22 are loading their respective beds 26, 30, 34, 38. That is, video streaming systems 12, 14 transmit respective live video feeds (not shown in FIG. 1) including live video (not shown in FIG. 1) from respective cameras 40, 42 over respective wireless networks to the mobile devices (not shown in FIG. 1) of the drivers. The mobile devices of the drivers may be any devices that can connect to a wireless network such as cell phones, tablets, in-dash displays in their vehicles, or laptops, as non-limiting examples. The live video feeds enable the drivers of dump trucks 24, 28, 32, 36 to view their respective beds 26, 30, 34, 38 on their mobile devices. When viewing the beds 26, 30, 34, 38 of respective dump trucks 24, 28, 32, 36 during the loading operation, the drivers can make adjustments to make sure that all of the material output by mills 20, 22 is loaded into beds 26, 30, 34, 38, is evenly distributed, and forms a full load for delivery. Thus, the drivers are able to improve the safety, efficiency, and productivity associated with milling operation 10.

When first mill 20 is loading first dump truck 24, video streaming system 12 transmits its live video feed including the live video from camera 40 to the mobile device of the driver of first dump truck 24. Video streaming system 12 may transmit the live video feed only to the mobile device of the driver of first dump truck 24 as the closest mobile device or may additionally transmit the live video feed to the mobile device of the driver of second dump truck 28 so that the driver of second dump truck 28 can view how close first dump truck 24 is to completing its loading operation. Further, video streaming system 12 may establish an audio connection between the drivers of first and second dump trucks 24, 28 so that they can communicate regarding the loading operation. Once the loading operation for first dump truck 24 is complete, the driver of second dump truck 28 may drive forward and start the loading operation for second dump truck 28.

Video streaming system 14 operates in the same manner as video streaming system 12. That is, when second mill 22 is loading third dump truck 32, video streaming system 14 transmits its live video feed including the live video from camera 42 to the mobile device of the driver of third dump truck 32. Video streaming system 14 may transmit the live video feed only to the mobile device of the driver of third dump truck 32 as the closest mobile device or may additionally transmit the live video feed to the mobile device of the driver of fourth dump truck 36 so that the driver of fourth dump truck 36 can view how close third dump truck 32 is to completing its loading operation. Further, video streaming system 14 may establish an audio connection between the drivers of third and fourth dump trucks 32, 26 so that they can communicate regarding the loading operation. Once the loading operation for third dump truck 32 is complete, the driver of third dump truck 36 may drive forward and start the loading operation for fourth dump truck 36.

Since video streaming systems 12, 14 are in close proximity to each other, the wireless networks broadcast by video streaming systems 12, 14 may be configured not to overlap with each other to reduce interference in the loading operations. Further, depending on whether the drivers are approved to access both video streaming systems 12, 14, the drivers of dump trucks 24, 28, 32, 36 may use their mobile devices to select whether to connect to the wireless network of video streaming system 12 or video streaming system 14 to avoid receiving the incorrect live video feed. As a non-limiting example, if the driver of first dump truck 24 returns from delivering a load and it would be more efficient to go to second mill 22 instead of first mill 20, the driver may elect to connect to the wireless network of video streaming system 14. Once the mobile device of the driver of dump truck 24 is within range, video streaming system 14 may automatically connect the driver's mobile device to its wireless network and transmit its live video feed. These types of settings associated with video streaming systems 12, 14 may be selected in a mobile application associated with video streaming systems 12, 14. This mobile application will be referred to herein as a video streaming application or video streaming app and is described in more detail below.

Referring to FIGS. 2A-2D, a series of perspective views of a live video feed 44 of video streaming system 12 of FIG. 1 illustrating an efficient loading operation of bed 26 of first dump truck 24 is shown, according to an embodiment of the invention. While FIGS. 2A-2D are described with respect to live video feed 44 of video streaming system 12 and bed 26 of first dump truck 24, the description is equally applicable to video streaming system 14 and beds 30, 34, 38 of second, third, and fourth dump trucks 28, 32, 36, respectively. The progression of the loading operation begins in FIG. 2A and continues to FIGS. 2B, 2C, and 2D. During the loading operation, the driver of dump truck 24 can view live video feed 44 and can, therefore, ensure that the material is loaded evenly and that bed 26 obtains a full load.

Figure 2B:
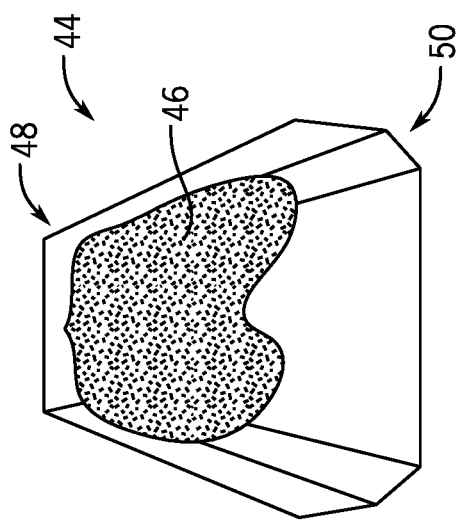
FIGS. 2A-2D are a series of perspective views of a live video feed of a video streaming system of FIG. 1 showing an efficient loading operation of a dump truck bed of FIG. 1, according to an embodiment of the invention.
Figure 2D:
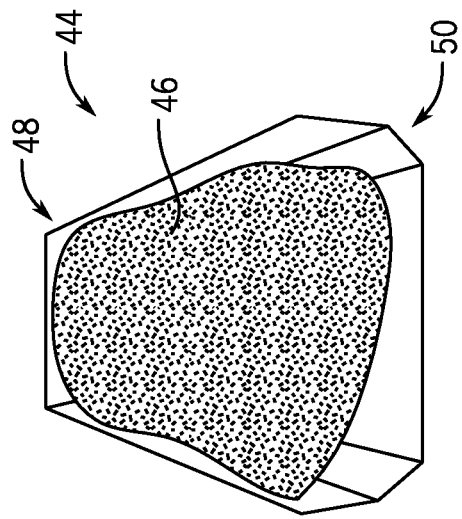
Figure 2A:
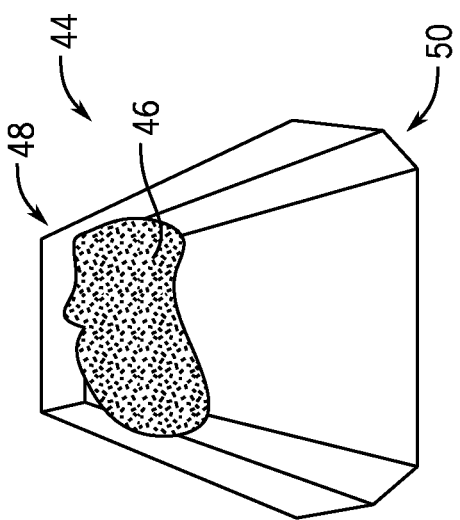
Figure 2C:
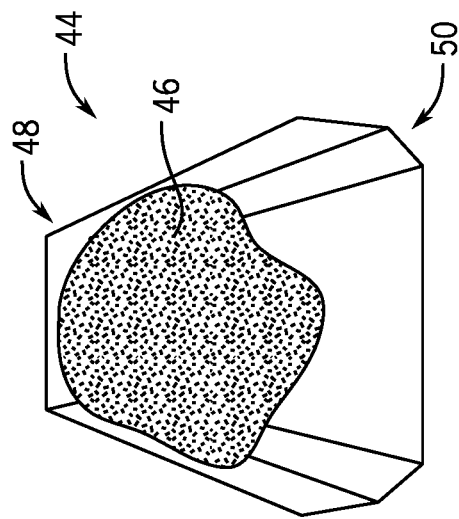

As shown in FIG. 2A, a load 46 in bed 26 of first dump truck 24 is forming at a front end 48 of bed 26. In FIG. 2B, load 46 in bed 26 has built up at front end 48 of bed 26 and has begun to fill toward a back end 50 of bed 26. In FIG. 2C, load 46 continues to grow and spread throughout bed 26 in an even manner. In FIG. 2D, load 46 is now large enough to be considered a full load, and the driver of dump truck 24 may proceed to deliver load 46. The loading operation demonstrated by way of FIGS. 2A-2D illustrates how video streaming system 12 provides a significant advantage to drivers of commercial vehicles or equipment during a loading operation.

In some embodiments, video streaming system 12 is able to track load 46 with respect to the size of bed 26. That is, video streaming system 12 may calculate and track a weight and/or volume of load 46 over time. Video streaming system 12 may also store or calculate a weight capacity and/or volume of bed 26. Using the weight and/or volume values for load 46 and bed 26, video streaming system 54 may calculate how close bed 26 is to being filled by load 46. Video streaming system 54 may include and be updated with various information regarding first dump truck 24 and the weight of the material being deposited into bed 26. Video streaming system 54 may also include artificial intelligence programming that is able to make the necessary calculations and track data regarding load 46, bed 26, and first dump truck 24.

Video streaming system 12 may provide the data relating to how close load 46 is to being considered a full load for bed 26 to drivers and/or equipment operators as raw data or as a fill percentage or ratio indicating how full bed 26 is at a given time. Video streaming system 12 may send an alert to drivers and/or equipment operators once the weight or volume of load 46 or the fill percentage crosses a predetermined threshold. In some embodiments, video streaming system 12 may send an alert to drivers and/or equipment operators once the fill percentage crosses 50%, 75%, 80%, and/or 90%, as non-limiting examples. This functionality will aid drivers and equipment operators in determining when to stop filling first dump truck 24 (or various vehicle types in various types of loading operations).

Figure 3:
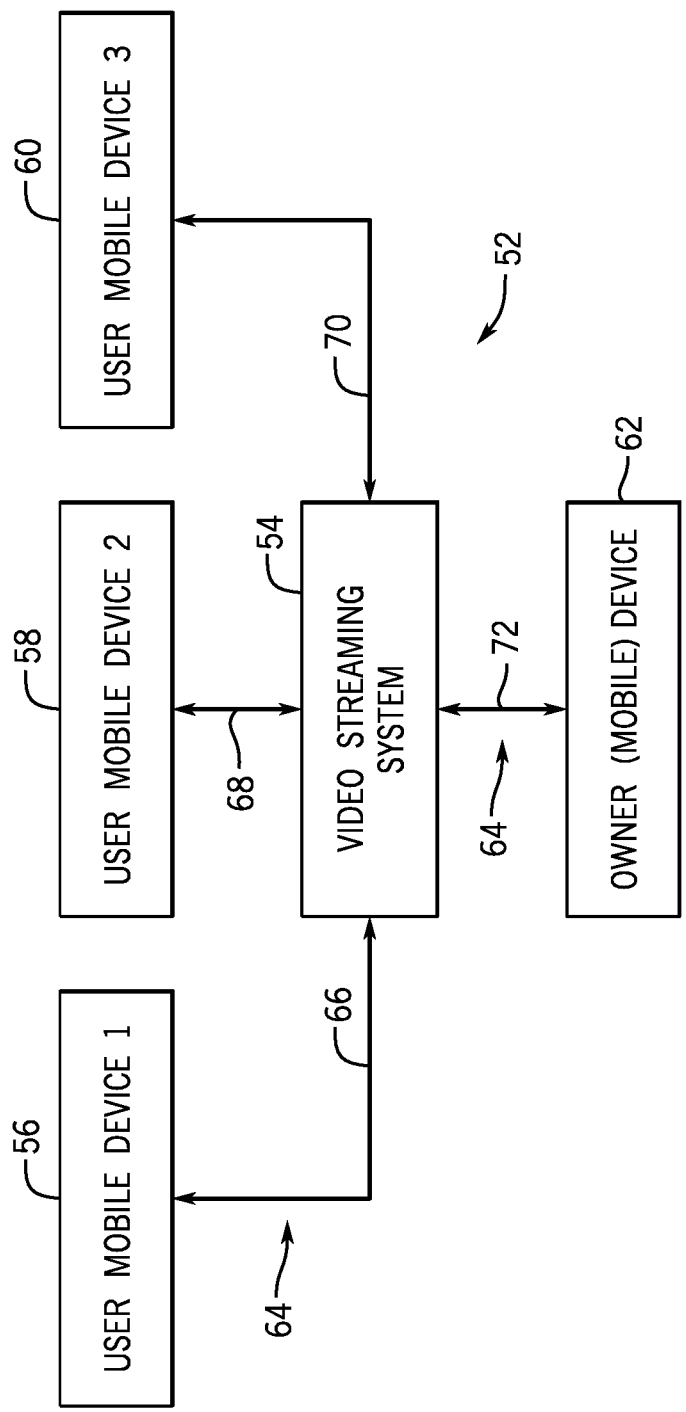
FIG. 3 is a block diagram of communications between a video streaming system, user mobile devices, and an owner device, according to an embodiment of the invention.

Referring now to FIG. 3, a block diagram 52 of communications between a video streaming system 54 usable as video streaming systems 12, 14 in FIG. 1, first, second, and third user mobile devices 56, 58, 60, and an owner device 62 is shown, according to an embodiment of the invention. First, second, and third user mobile devices 56, 58, 60 are in use by users approved or authorized to connect to wireless network 64 of video streaming system 54 for the purpose of conducting loading operations. Owner device 62 is generally in use by an owner of video streaming system 54 or by another person authorized by the owner who has control over the operation of and settings for video streaming system 54. However, when owner device 62 is in use by a person authorized by the owner, such as, for example, an employee of the owner, the owner may set more limited permissions for that person. While three user mobile devices 56, 58, 60 and one owner device 62 are shown, video streaming system 54 may communicate with more or less user and/or owner devices, as necessary or desired. The configuration shown should not be considered limiting.

Video streaming system 54 broadcasts a wireless network 64 that video streaming system 54 may use to establish wireless connections 66, 68, 70, 72 to first, second, and third user mobile devices 56, 58, 60 and owner device 70, respectively. However, wireless connection 72 between video streaming system 54 and owner device 62 may alternatively be a wired connection, depending on where video streaming system 54 is positioned and how video streaming system 54 is being used. As a non-limiting example, if video streaming system 54 is in use on a mill and owner device 62 is a screen incorporated into the mill, connection 62 between video streaming system 54 and owner device 62 may be wireless or wired. As another non-limiting example, if video streaming device 54 is located remotely from owner device 62, connection 72 will need to be wireless.

Connections 66, 68, 70, 72 between video streaming system 54 and devices 56, 58, 60, 62 allow video streaming system 54 to transmit a live video feed (not shown in FIG. 3) to any of devices 56, 58, 60, 62. In addition, video streaming system 54 may use connections 66, 68, 70, 72 to establish an audio connection between devices 56, 58, 60, 62 that allow the users to communicate with each other or with the owner. The audio connection may be a continuous audio connection that acts like a phone call between the users and/or the owner on their respective devices 56, 58, 60, 62. This type of audio connection may be muted, put on hold, or ended on an individual basis by any user and/or owner in the video streaming application. Alternatively, the audio connection between a discontinuous audio connection acting like a two-way radio system that a user and/or owner must trigger on their mobile device. That is, in order to communicate with others, the users and/or the owner would need to activate the function in the video streaming application, but the users and/or the owner would be able hear communications from others without activation unless the users and/or owner turned off the function.

Figure 4:
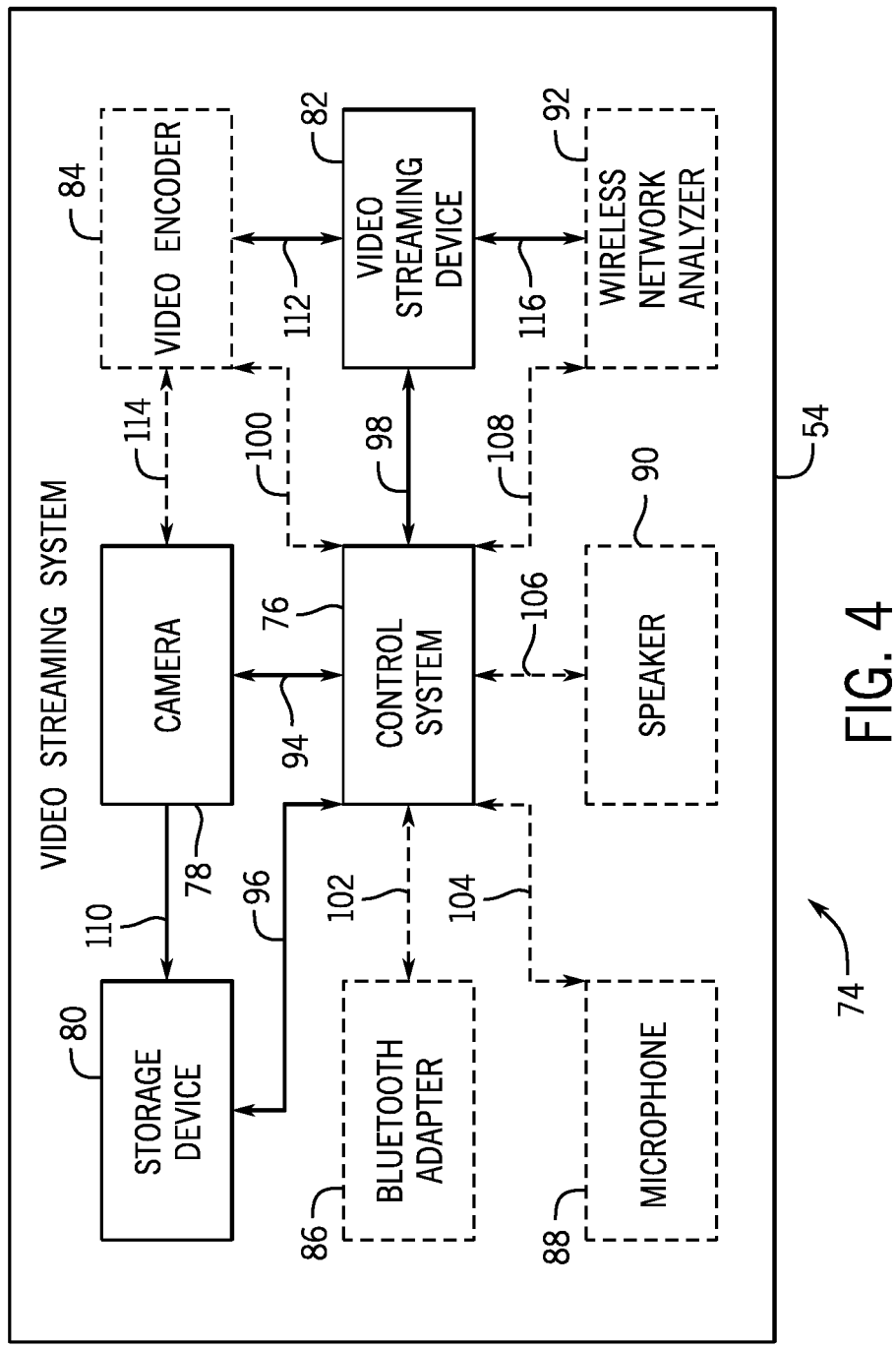
FIG. 4 is a block diagram of the video streaming system of FIG. 3, according to an embodiment of the invention.

Referring now to FIG. 4, a block diagram 74 of video streaming system 54 including wireless network 64 shown in FIG. 3 is shown, according to an embodiment of the invention. Video streaming system 54 includes a control system 76, a camera 78, a storage device 80, and a video streaming device 82. Video streaming system 54 may optionally include a video encoder 84, a Bluetooth® adapter 86, a microphone 88, a speaker 90, and a wireless network analyzer 92. While only one of each component of video streaming system 54 is shown, video streaming system 54 may have more of any of the components or various components may be integrated into a single component. In some embodiments, all of the components of video streaming system 54 are integrated into a single device with the functionality of all of the integrated components.

Control system 76 includes one processor configured to individually perform control system functions or a plurality of processors configured to individually and/or collectively perform control system functions. That is, where control system 76 includes only one processor, that processor is capable of performing all the functions of control system 76, and where control system 76 includes more than one processor, those processors may each be configured to perform all the functions of control system 76 and/or may be configured to perform the functions of control system 76 collectively. In some embodiments, some or all of the processors of control system 76 may be integrated into one or more of the other components of video streaming system 54 such as, for example, camera 78 or video streaming device 82. Control system 76 may also include one or more network interface controllers for establishing a network between other video streaming systems 54 or the components of video streaming system 54, as necessary or desired. In general, control system 76 is in communication with and in control of the other components of video streaming system 54 via connections 94, 96, 98, 100, 102, 104, 106, 108. Connections 94, 96, 98, 100, 102, 104, 106, 108 may be wired or wireless, depending on the position of control system 76 with respect to the relevant component of video streaming system 54.

Camera 78 is configured/positioned to capture live video during a loading operation or another relevant circumstance. While only one camera 78 is shown, video streaming system 54 may include more than one camera 78 to provide different views to users. In general, camera 78 will be adjustable by owners via their mobile devices. That is, an owner of video streaming system 54 may adjust the angle (for example, via up, down, left, and right arrows on the owner's device) and/or zoom (for example, via plus and minus signs on the owner's device) of camera 78 on the owner's device. An owner may also choose to allow users to adjust camera 78 via their mobile devices. An owner may allow all users to adjust camera 78 or only specific trusted users, as desired.

Camera 78 generally provides the captured live video to storage device 80 via connection 110, which may be wired or wireless. In some embodiments, storage device 80 may be located on/integrated with camera 78. Storage device 80 may be in the form of a memory, a secure digital (SD) card, a flash drive, a solid state drive (SSD), a hard disk drive (HDD), or another type of storage device usable for such purposes. The type of storage device 80 may depend on whether storage device 80 is configured to store only a specific amount of data temporarily or configured to store data for a longer term or on a permanent basis. In either case, video streaming system 54 may be configured such that live video on storage device 80 is transferred to a remote storage device over its wireless network 64, a separate wireless network established via a subscriber identity module (SIM) card and/or a mobile hotspot device, or a wired connection. It may be beneficial for storage device 80 to be removable so that data on storage device 80 may be transferred to a remote storage device manually due to a failure of a wireless connection or based on an owner's preference.

Camera 78 also provides the captured live video to video streaming device 82 via wireless or wired connection 112. Video streaming device 82 establishes and broadcasts wireless network 64 over which it is able to transmit a live video feed that typically includes the live video captured by each camera 78 in video streaming system 54. Wireless network 64 may be an open or a closed network. However, a closed or private wireless network may be beneficial due to enhanced security features. For example, when wireless network 64 is a closed and/or private network, the service set identifier (SSID) of wireless network 64 may be hidden and/or users may require a registered SIM card to connect to wireless network 64.

Video streaming device 82 may include a wireless router, a Bluetooth® router, a mobile hotspot, and/or a wireless access point (AP), as non-limiting examples. Video streaming device 82 may establish wireless network 64 using a variety of different communication types such as Wi-Fi®, Bluetooth®, mobile/cellular, Zigbee, Thread, Matter, and/or Z-Wave communications, as non-limiting examples. Where video streaming device 82 uses multiple types of communications, video streaming device 82 may establish multiple wireless networks 64. Video streaming device 82 will generally include one or more transmitters, one or more receivers, and/or one or more transceivers for transmitting and receiving signals. Video streaming system 54 may include Bluetooth® adapter 86 separately for handling Bluetooth® connections. Control system 76 may use wireless network analyzer 92 to track and analyze the performance of wireless network 64 over connection 116 to video streaming device 82 and instruct video streaming device 82 to make changes to wireless network 64 to optimize performance of wireless network 64 based on the data from wireless network analyzer 92.

In some embodiments, camera 78 first provides the captured live video to video encoder 84 via wireless or wired connection 114 for compression. Thereafter, video encoder 84 provides video streaming device 82 with a compressed live video over connection 112. The video streaming device 82 then transmits the live video feed with the compressed live video. The use of video encoder 84 and the compressed live video will generally decrease the load on video streaming device 82 and improve the quality of the live video feed transmitted by video streaming device 82.

When video streaming system 54 includes microphone 88 and speaker 90, the owners and/or users may listen to the activity around video streaming system 54 and communicate to those in the area. Microphone 88 and speaker 90 may be positioned anywhere that is most convenient for their operation. As a non-limiting example, they may be integrated with or positioned on or near camera 78. An owner of video streaming system 54 may limit the availability of audio from microphone 88 only to owners or may make it available to users as well. Similarly, an owner may limit the availability to use speaker 90 to owners or make speaker 90 available to users as well.

Referring now to FIGS. 5 and 5A-5D, flowcharts setting forth exemplary steps of methods, processes, or techniques 118, 120, 122, 124, 126 for operating video streaming system 54 of FIGS. 3 and 4, according to an embodiment of the invention. Method 118 of FIG. 5 details the main operation of video streaming system 54, and methods 120, 122, 124, 126 of FIGS. 5A-5D are optional methods that may be included as part of the main operation of video streaming system 54 in some embodiments. In describing methods 118, 120, 122, 124, 126, reference will be made to the various components of video streaming system shown in FIG. 4. Generally, the steps of each method 118, 120, 122, 124, 126 are performed by control system 76 of video streaming system 54. Method 118 of FIG. 5 begins at STEP 128 when power is provided to video streaming system 54. Video streaming system 54 may be directly connected to power or may receive power via a machine, apparatus, or system on which it is positioned. In the latter case, video streaming system 54 may receive power when the machine, apparatus, or system is powered on or when an operator of the machine, apparatus, or system elects to provide power.

At STEP 130, control system 76 initiates video streaming system 54. The initiation includes activation of camera 78 and video streaming device 82. That is, camera 78 begins capturing live video, and video streaming device 82 begins broadcasting wireless network 64. Next, at STEP 132, video streaming system 54 receives a connection request from a mobile device in range of wireless network 64 such as, for example, the first, second, or third user mobile devices 56, 58, 60 shown in FIG. 3. At this time, control system 76 may be actively monitoring mobile devices in range of wireless network 64 or may be passively waiting for connection requests from mobile devices. The mobile device may automatically send the connection request once it detects wireless network 64 or a user of the mobile device may trigger the connection request.

A mobile device may be considered in range of wireless network 64 when the mobile device enters the area covered by wireless network 64. In other words, the range of wireless network 64 may be defined by the signal strength/range of wireless network 64. The signal strength of wireless network 64 may be set on video streaming device 82, as desired. The signal strength may be set to allow for a longer range to allow mobile devices to more easily detect wireless network 64 or may be set to a shorter range to prevent too many users from connecting to wireless network 64, as non-limiting examples.

Figure 5:
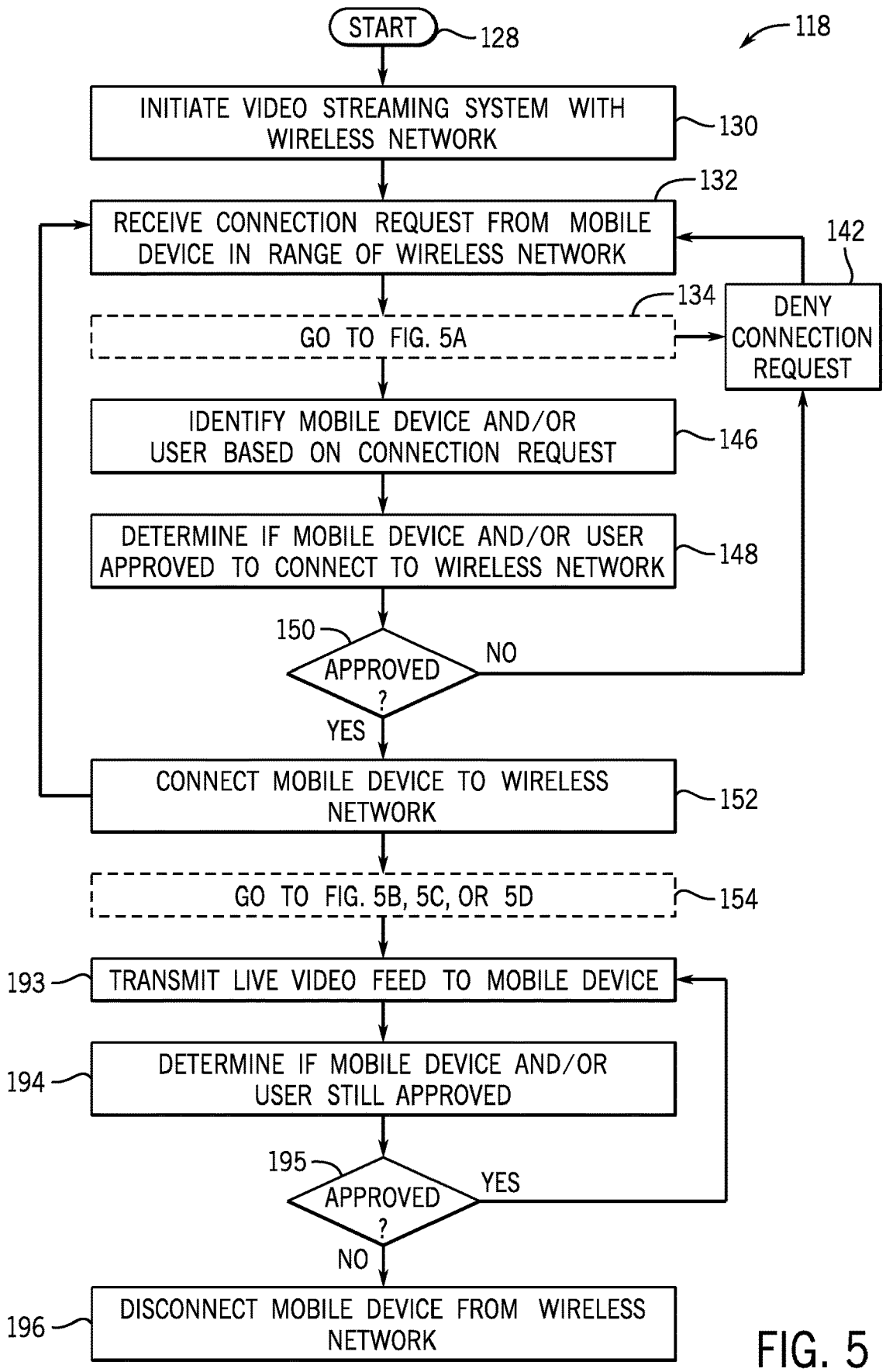
FIG. 5 is a flowchart setting forth exemplary steps of a technique for operating the video streaming system of FIGS. 3 and 4, according to an embodiment of the invention.
Figure 5A:
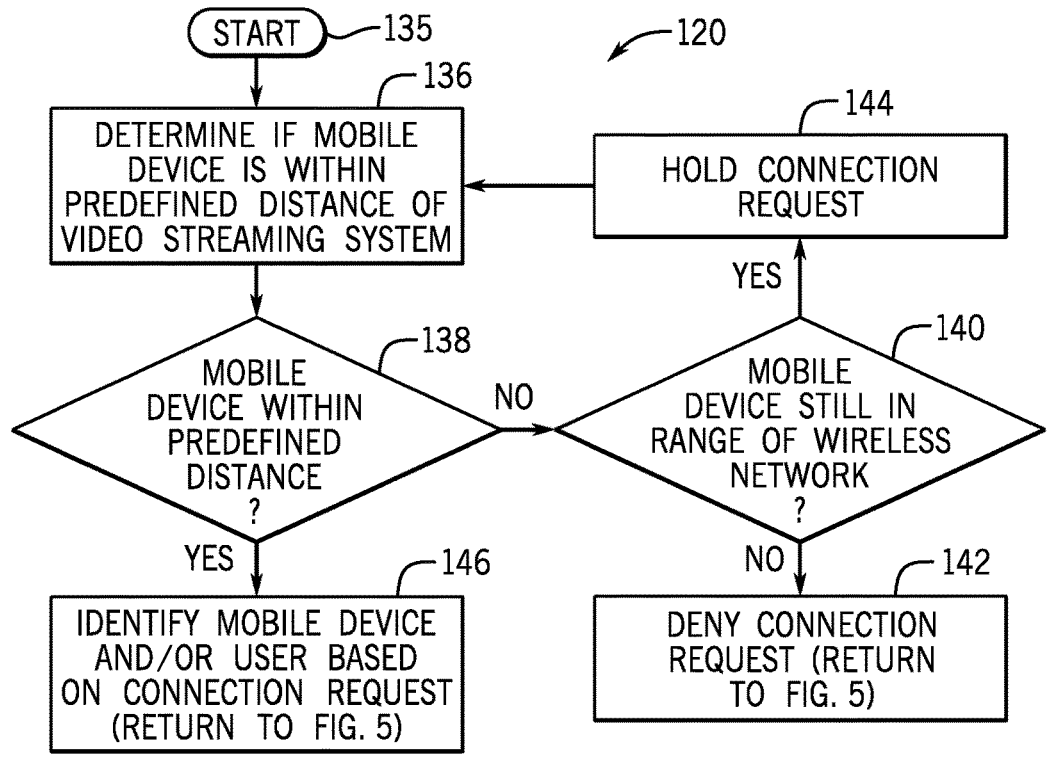
FIGS. 5A-5D are flowcharts setting forth exemplary steps of techniques for use with the technique of FIG. 5, according to an embodiment of the invention.

At STEP 134, control system 76 may proceed to execute optional method 120 shown in FIG. 5A as part of method 118. Referring now to FIG. 5A, method 120 begins at STEP 135 after video streaming system 54 receives a connection request from a mobile device. At STEP 136, after receiving the connection request, control system 76 determines if the mobile device is within a predefined distance of video streaming system 54. Determining whether the mobile device is within a predefined distance of video streaming system 54 will generally aid in preventing unnecessary connections to mobile devices that slow down wireless network 64, eliminating connections to the wrong video streaming system 54 where multiple video streaming systems 54 are present, and in improving the security of wireless network 64. As a non-limiting example, in milling operation 10 of FIG. 1, setting a predefined distance from video streaming systems 12, 14 would aid in preventing first and second dump trucks 24, 28 from incorrectly connecting to video streaming system 14 and third and fourth dump trucks 32, 36 from incorrectly connecting to video streaming system 12, which would unnecessarily burden both video streaming systems 12, 14 and the drivers of dump trucks 24, 28, 32, 36.

This predefined distance may be measured between the mobile device and any of the components of video streaming system 54 such as, for example, control system 76, camera 78, or video streaming device 82. In various embodiments, the predefined distance may be measured from a central point between two or more components of video streaming system 54. Control system 76 may be configured to determine the distance between the mobile device and video streaming system 54 with a received signal strength indicator (RSSI)-based method using the strength of the signal from the mobile device, a multi-carrier phase ranging (MCPR)-based method using the phase shift of multiple carrier frequencies, or a global positioning system (GPS) data-based method using GPS data from the mobile device, as non-limiting examples. In some embodiments, geofencing may be implemented to determine if the mobile device The predefined distance may be set by an owner of video streaming system 54. The predefined distance may be set to any value within the range of the wireless network of video streaming device 82 and, therefore, depends on the strength of wireless network 64. In some embodiments, the predefined distance may be set to 10, 25, 50, or 100 feet or 3, 8, 15, or 30 meters, as non-limiting examples. The desired value for the predefined distance will depend the operation with which video streaming system 54 is being used. That is, some operations may call for a shorter predefined distance and some may call for a longer predefined distance based on many different considerations such as, for example, the number and location of video streaming systems 54 present, the point at which the live video feed will become beneficial to the user of the mobile device, and the desire for increased security.

At STEP 138, if the mobile device is not within the predefined distance from video streaming system 54, method 120 proceeds to STEP 140, where control system 76 determines whether the mobile device is still in range of wireless network 64. If not, control system 76 ceases the operation of method 120 of FIG. 5A and proceeds to STEP 142 of method 118 of FIG. 5. At STEP 142, control system 76 denies the connection request from the mobile device since the mobile device is no longer within range of wireless network 64. If instead the mobile device is still within range of wireless network 64, control system 76 proceeds to STEP 144 of method 120 and places a hold on the connection request until the mobile device is within the predefined distance of video streaming system 54 or is no longer in range of wireless network 64.

Returning to STEP 138, if the mobile device is within the predefined distance of video streaming system 54, control system 76 ceases the operation of method 120 of FIG. 5A and proceeds to execute STEP 146 of method 118 of FIG. 5. At STEP 146 of FIG. 5, control system 76 identifies the mobile device and/or a user of the mobile device. In identifying the mobile device and/or the user of the mobile device, control system 76 typically identifies whether the mobile device is associated with a user and/or an owner of video streaming system 54 and/or whether the user of the mobile device is a user and/or owner of the video streaming system 54. Distinguishing between a user and an owner of video streaming system 54 may be important, as users and owners of video streaming device 54 will usually have different permissions or authorizations with respect to what is available to view and change in video streaming system 54.

Control system 76 may identify the mobile device and/or a user of the mobile device via one or a combination of identifiers such as a device identification (ID) number, an international mobile equipment identity (IMEI) number, an integrated circuit card ID (ICCID) number, an internet protocol (IP) address, a media access control (MAC) address, a Bluetooth® address, a user ID number, or a user name and password/passcode. Where an identifier is unique, control system 76 may identify the mobile device based on that unique identifier alone. Where identifiers are not unique or are potentially not unique, control system 76 may use a combination of identifiers to identify the mobile device.

Control system 76 may identify the mobile device and/or the user of the mobile device based on a signal generated by the video streaming application on the mobile device. The signal generated by the video streaming application will be unique to the user and may be generated based on the user signing into the video streaming application on the mobile device. The unique signal will be associated with the user upon the user creating an account with the video streaming application and may convey a unique user identifier such as, for example, a user ID number or unique user name.

After identifying the mobile device and/or the user of the mobile device, control system 76 proceeds to STEP 148 of method 118 and determines whether the mobile device and/or user is approved to connect to the wireless network. Owners may use unique mobile device identifiers and/or unique user identifiers to register mobile devices and/or users with video streaming system 54. In addition, owners may provide users with unique code that allows them to register their mobile devices or themselves with video streaming system 54. Once a mobile device and/or user is registered with video streaming system 54, the mobile device and/or user is considered at least authorized or approved to connect to the wireless network broadcast by video streaming device 82, subject to the conditions described herein. In determining whether the mobile device and/or user is approved to connect to the wireless network, control system 76 may compare the identity of the mobile device to a list of all mobile devices authorized to connect to wireless network 64, the identity of the user to a list of all users authorized to connect to wireless network 64, and/or the identity of the mobile device and/or the identity of the user to a list of all mobile devices and users authorized to connect to the wireless network 64.

Additionally, if the user is signed into the video streaming application on the mobile device, the video streaming application will recognize that the user is approved to connect to wireless network 64 and may send an approval or authorization signal unique to video streaming system 54 to simplify the process. In some embodiments, specific owner approval is conducted via the video streaming application. That is, a user may download the streaming application, subscribe to a service associated with the video streaming application, and/or obtain a license via the video streaming application. Users with the video streaming application on their mobile devices may automatically have approval to connect to video streaming system 54 (and receive the live video feed from wireless network 64) either with or without a paid subscription. Users may also have approvals associated with different categories such as specific equipment manufacturers (for example, a manufacturer of mills), specific activities (for example, milling) regardless of manufacturer, or a specific geographic location (for example, a city, county, state, or country), as non-limiting examples. When users need a subscription and/or a license, owners may provide a specific access code to one or more of their video streaming systems that users can enter into the video streaming application to facilitate approval. These access codes can also be affiliated with different categories such as those noted above.

At STEP 150, if the mobile device and/or user is not approved to connect to wireless network 64, control system 76 proceeds to STEP 142 and denies the connection request from the mobile device. If the mobile device and/or user is approved to connect to wireless network 64, control system 76 proceeds to STEP 152 and instructs video streaming device 82 to connect the mobile device to wireless network 64. At STEP 154, control system 76 may optionally execute method 122 of FIG. 5B, method 124 of FIG. 5C, and/or method 126 of FIG. 5D as part of method 118 of FIG. 5. Methods 122, 124, 126 are typically executed when owners have not allowed mobile devices to automatically receive the live video feed from video steaming device 82 upon connection to wireless network 64 and may be executed in any order.

Figure 5B:
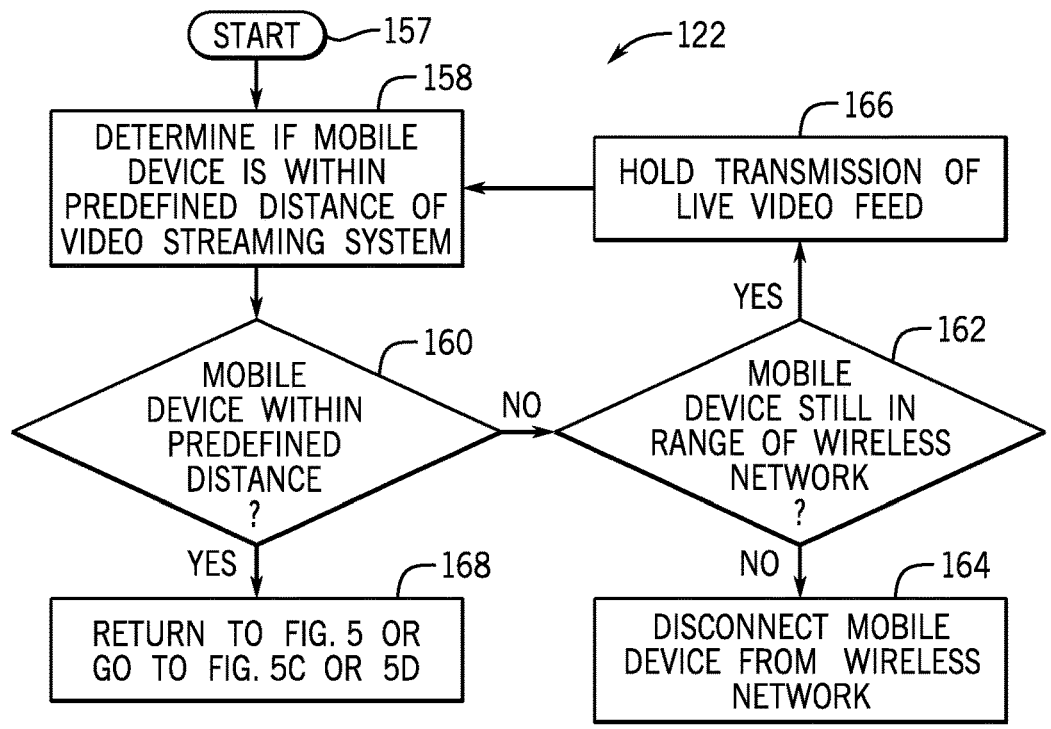
Figure 5C:
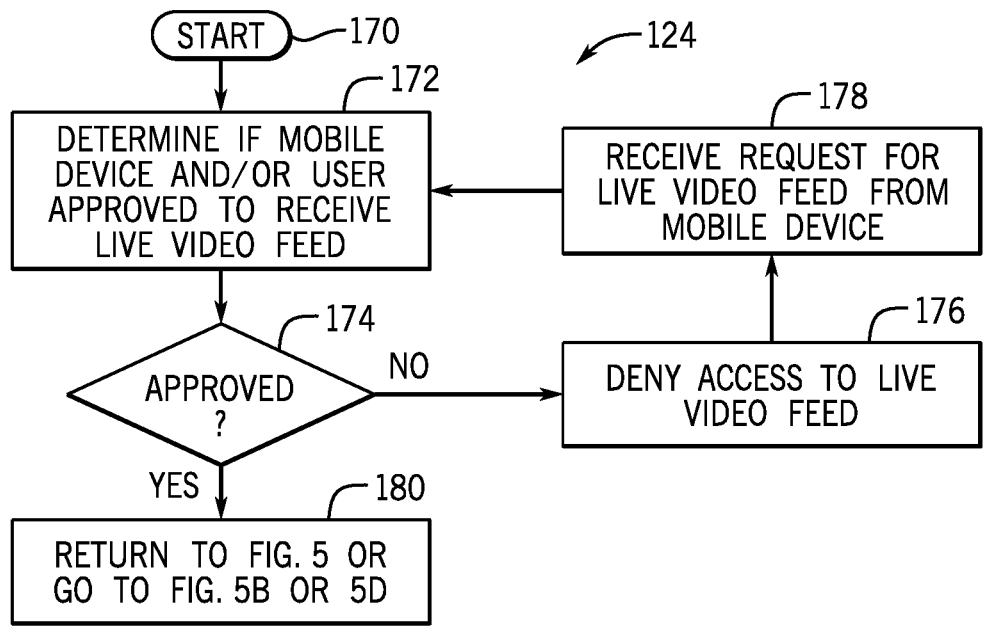
Figure 5D:
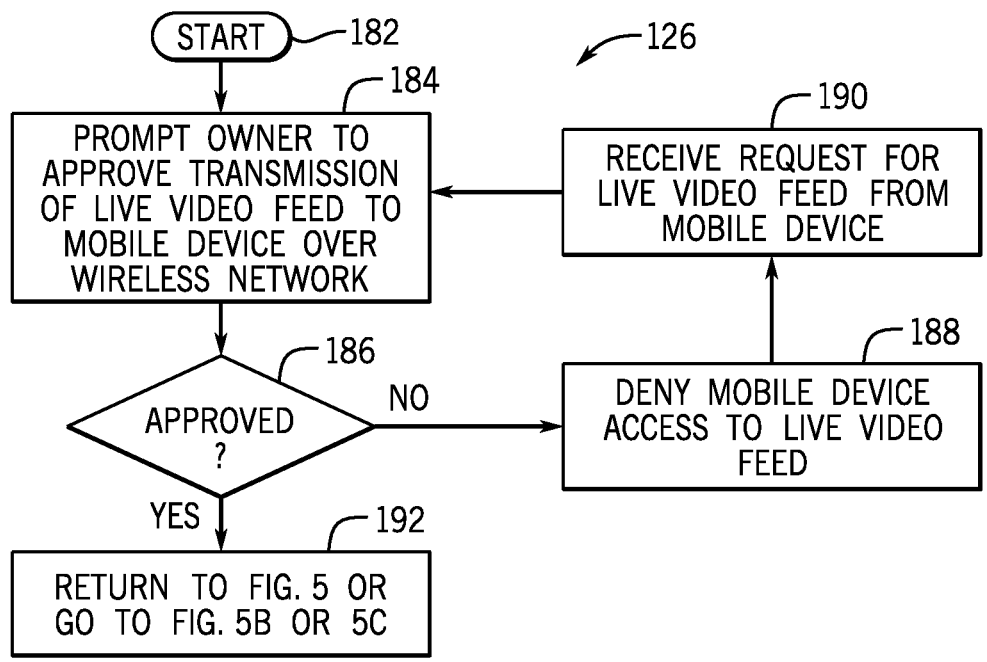

Referring now to FIG. 5B, method 122 begins at STEP 156 after the mobile device connects to wireless network 64 at STEP 152 of method 118 of FIG. 5 or following completion method 124 of FIG. 5C or method 126 of FIG. 5D. Method 122 is a modified version of method 120 of FIG. 5A. That is, method 122 is modified from method 120 in that, instead of placing a hold on the connection request from the mobile device, control system 76 may place a hold on the transmission of the live video feed from video streaming device 82. At STEP 158, after the mobile device is connected to wireless network 64, control system 76 determines if the mobile device is within a predefined distance of video streaming system 54. Control system 76 generally makes this determination in the same manner and for similar reasons described above with respect to STEP 136 of method 120 of FIG. 5A.

The predefined distance may be same predefined distance described with respect to STEP 136 of method 120 of FIG. 5A or may be a different predefined distance. In general, if the predefined distance associated with approval to connect to wireless network 64 is not the same as the predefined distance associated with approval to receive the live video feed, the live video feed predefined distance is shorter than the wireless network connection predefined distance. As a non-limiting example, if the wireless network connection predefined distance is 50 feet or 15 meters, the live video feed predefined distance might be 25 feet or 8 meters. Of course, how an owner sets the different predefined distances will depend on the specific circumstances under which video streaming system 54 is being used.

At STEP 160, if the mobile device is not within the predefined distance from video streaming system 54, method 122 proceeds to STEP 162, where control system 76 determines whether the mobile device is still in range of wireless network 64. If not, control system 76 ceases the operation of method 122 of FIG. 5B and proceeds to STEP 164. At STEP 164, control system 76 instructs video streaming device 82 to disconnect the mobile device from wireless network 64 since the mobile device is no longer within range. If instead the mobile device is still within range of wireless network 64, control system 76 proceeds to STEP 166 of method 122 and places a hold on the transmission of the live video feed to the mobile device until the mobile device is within the predefined distance of video streaming system 54 or is no longer in range of wireless network 64. Returning to STEP 160, if the mobile device is within the predefined distance of video streaming system 54, control system 76 proceeds to STEP 168, ceases the operation of method 122 of FIG. 5B, and returns to method 118 of FIG. 5 or proceeds to method 124 of FIG. 5C or method 126 of FIG. 5D.

Referring now to FIG. 5C, method 124 is directed to whether a mobile device and/or user is approved to receive the live video feed from video streaming device 82. Method 124 may be implemented where an owner has not approved all mobile devices and/or users to receive the live video feed, even if they are approved to connect to wireless network 64. Method 124 begins at STEP 170 after the mobile device connects to wireless network 64 at STEP 152 of method 118 of FIG. 5 or following completion method 122 of FIG. 5B or method 126 of FIG. 5D. At STEP 172, control system 76 determines whether the mobile device and/or user are approved to receive the live video feed from video streaming device 82.

The same registrations of mobile devices and/or users that authorize or approve the mobile devices and/or users to connect to wireless network 64 described above with respect to STEP 148 of method 118 of FIG. 5 may also authorize or approve the mobile devices and/or users to receive the live video feed from video streaming device 82. However, owners may require an additional level of approval or authorization for receipt of the live video feed. In that case, mobile devices and/or users that do not already have the additional level of approval may obtain approval from an owner for a specified timeframe (such as, for example, one day, one week, or several hours) before attempting to use video streaming system 54 or may be able to request approval to receive the live video feed from video streaming system 54 in real time, as described below.

At STEP 174, if the mobile device and/or user is not approved to receive the live video feed, control system 76 proceeds to STEP 176 and denies the mobile device and user access to the live video feed. The mobile device and/or user may then send a request to video streaming system 54 to transmit the live video feed to the mobile device. This request may come after the user has obtained approval or authorization from an owner of video streaming system 54. At STEP 178, control system 76 receives the request for the live video feed from the mobile device and again proceeds to STEP 172 determine whether the mobile device and/or user are approved to receive the live video feed from video streaming device 82. If the mobile device and/or user is still not approved to receive the live video feed at STEP 174, control system 76 again proceeds to STEP 176. However, if the mobile device and/or user are now approved to receive the live video feed at STEP 174, control system 76 proceeds to STEP 180, ceases the operation of method 124 of FIG. 5C, and returns to method 118 of FIG. 5 or proceeds to method 122 of FIG. 5B or method 126 of FIG. 5D.

Referring now to FIG. 5D, method 126 is directed to requesting approval or authorization from an owner to receive the live video feed from video streaming device 82 when a mobile device is already connected to wireless network 64. Method 126 may be implemented where an owner would like to be able to approve or deny requests for the live video feed on an individual basis during operation. The owner may activate method 126 where the owner believes there is a need for added security. Method 126 may also be activated if the owner has not already approved any mobile devices and/or users to receive the live video feed and does not have time to do so prior to starting an operation using video streaming system 54.

Method 126 begins at STEP 182 after the mobile device connects to wireless network 64 at STEP 152 of method 118 of FIG. 5 or following completion method 122 of FIG. 5B or method 124 of FIG. 5C. At STEP 184, control system 76 prompts an owner to approve transmission of the live video feed from video streaming device 82 to the mobile device connected to wireless network 64. The prompt will go to the owner's device, which may be wired or wireless. As such, the owner's device may be in the hands of the actual owner of video streaming system 54 or may be in the hands of the owner's authorized agent such as, for example, an employee or an independent contractor hired by the owner.

At STEP 186, if the owner did not approve transmission of the live video feed to the mobile device, control system 76 proceeds to STEP 188 and denies the mobile device access to the live video feed. Control system 76 may proceed to STEP 188 either due to an explicit selection of the owner to deny the mobile device access to the live video feed or due to a specific amount of time passing from when control system 76 sent the prompt to the owner. In some embodiments, control system 76 may proceed to STEP 188 after 1, 2, 3, 4, or 5 minutes has passed, as non-limiting examples.

After control system 76 denies the mobile device access to the live video feed, the mobile device and/or user may then send a request to video streaming system 54 to transmit the live video feed to the mobile device. This request may come after the user has conferred with the owner regarding approval or authorization to receive the live video feed or simply as a renewed request for the live video feed. At STEP 190, control system 76 receives the request for the live video feed from the mobile device. Thereafter, control system 76 again proceeds to STEP 184 and sends an additional prompt to an owner to approve transmission of the live video feed from video streaming device 82 to the mobile device. If the owner still does not approve transmission of the live video feed to the mobile device at STEP 186, the control system again proceeds to STEP 188. However, if the owner has approved transmission of the live video feed to the mobile device at STEP 186, control system 76 proceeds to STEP 192, ceases the operation of method 126 of FIG. 5D, and returns to method 118 of FIG. 5 or proceeds to method 122 of FIG. 5B or method 124 of FIG. 5C.

Referring again to FIG. 5, either directly after the mobile device is connected to wireless network 64 at STEP 152 or after performing method 122 of FIG. 5B, method 124 of FIG. 5C, and/or method 126 of FIG. 5D, control system 76 proceeds to step 193 and instructs video streaming device 82 to transmit the live video feed to the mobile device. Once the mobile device is receiving the live video feed, control system 76 will either continuously or periodically check the approval status of the mobile device and/or user. That is, at STEP 194, control system 76 determines if the mobile device and/or the user are still approved to connect to the wireless network and/or receive the live video feed using the methods described above in order to ensure that the approval granted to the mobile device and/or user has not been withdrawn. At STEP 195, if the mobile device and/or user is still approved to connect to wireless network 64 and/or receive the live video feed, video streaming device 82 will continue to transmit the live video feed to the mobile device. However, if the approval granted to the mobile device and/or user has been withdrawn, control system 76 will proceed to STEP 196 and instruct video streaming device 82 to disconnect the mobile device from wireless network 64.

Referring now to FIGS. 6-12, various screens of a user interface of the video streaming application for use with video streaming system 54 of FIGS. 3 and 4, according to an embodiment of the invention. The various screens and the buttons, icons, options, and layouts shown on the screens are merely exemplary and are not to be considered limiting. The user interface of the video streaming application may include additional screens and multiple different layouts for each screen. Furthermore, the buttons, icons, and options on each screen may also be included on other screens in various embodiments. The various screens shown may also appear different for users and owners of the video streaming systems and/or different screens may be available to users and owners of the video streaming systems.

Figure 6:
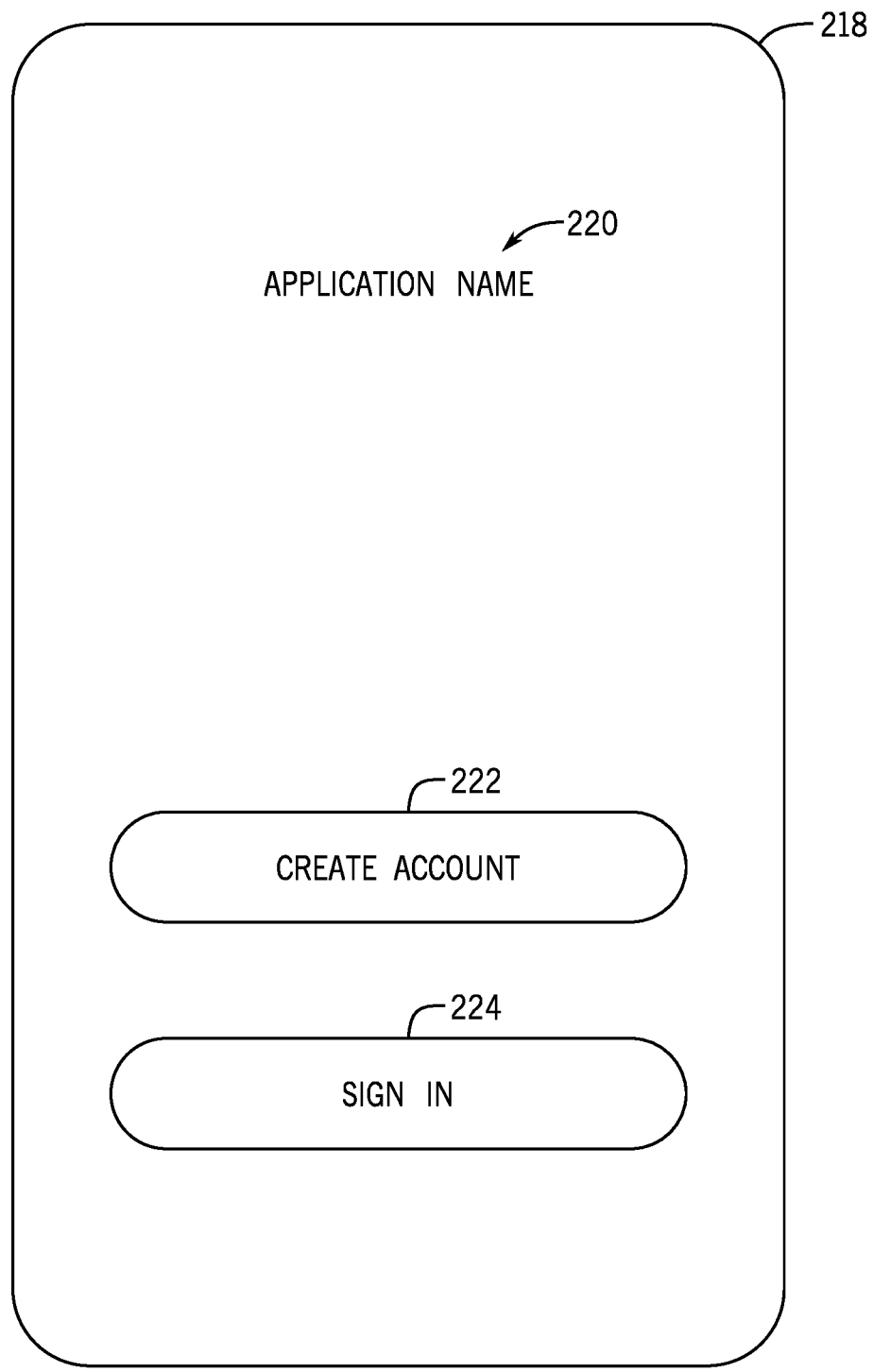
FIG. 6 is an open screen of a user interface of a mobile application for use with the video streaming system of FIGS. 3 and 4, according to an embodiment of the invention.

Referring initially to FIG. 6, an open screen 218 of the user interface of the video streaming application is shown, according to an embodiment of the invention. The video streaming application will generally take the user to open screen 218 upon initiation triggered by the user. Open screen 218 will display a name 220 of the video streaming application and offer an opportunity for a user to either create an account 222 or sign into an existing account 224 with the video streaming application. However, a user may also choose to remain signed into the video streaming application, in which case the video steaming application may display at a different screen upon its initiation.

Figure 7:
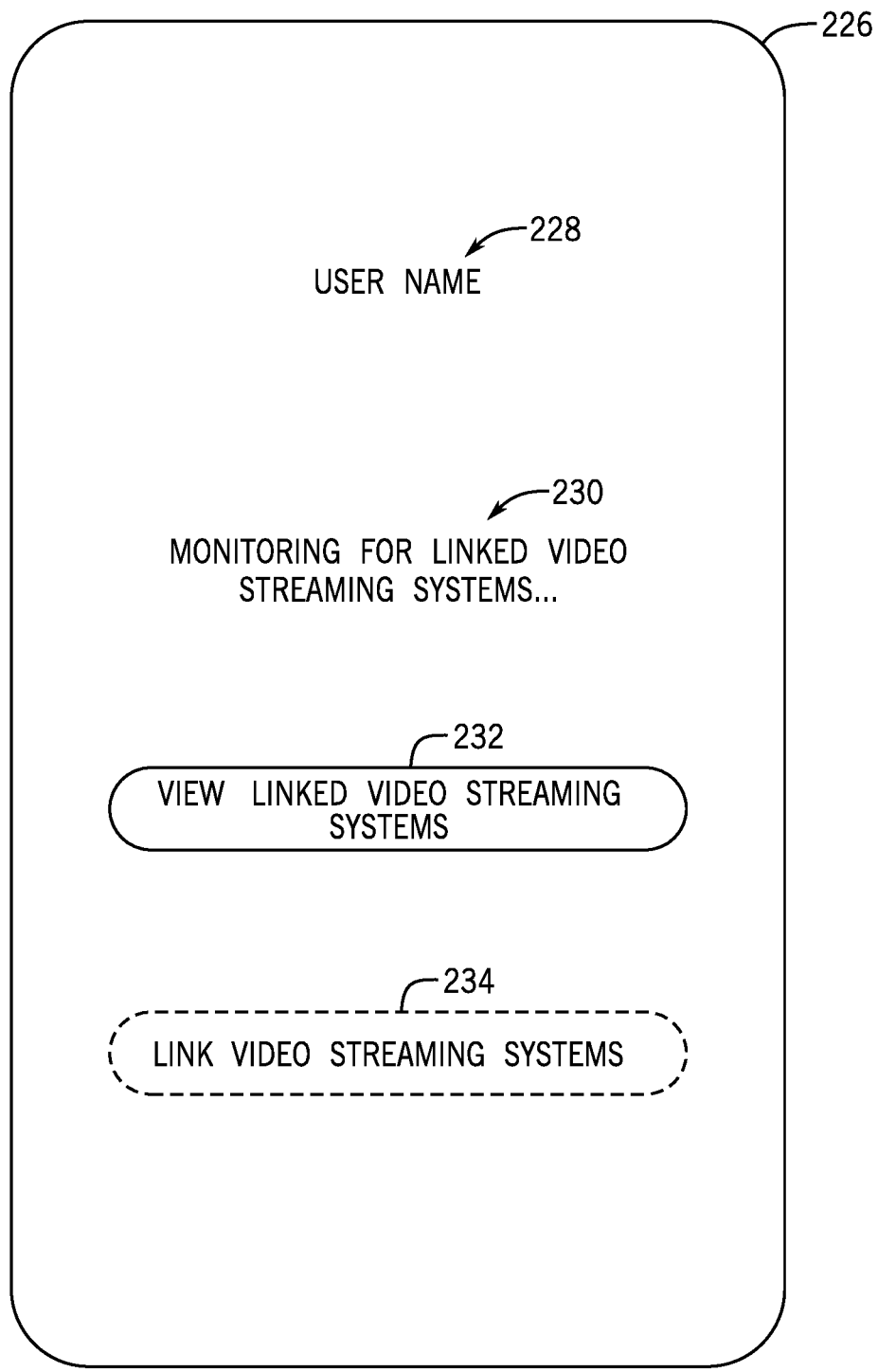
FIG. 7 is a video streaming system monitoring screen of the user interface of the mobile application for use with the video streaming system of FIGS. 3 and 4, according to an embodiment of the invention.

Referring now to FIG. 7, a video streaming system monitoring screen 226 of the user interface of the video streaming application is shown, according to an embodiment of the invention. Video streaming system monitoring screen 226 will generally show the user name 228 selected by the user and an indication that the video streaming application is monitoring for linked video streaming systems such as, for example, video streaming system 54 (FIGS. 3 and 4). The monitoring by the video streaming application includes monitoring for video streaming system wireless networks such as, for example, wireless network 64 (FIG. 3). video streaming system monitoring screen 226 also includes a selection to view linked video streaming systems 232, which are video streaming systems for which the user has approval to connect to the video streaming system's wireless network and/or the live video feed. In addition, video streaming system monitoring screen 226 may include an option to manually link to video streaming systems 234.

Figure 8:
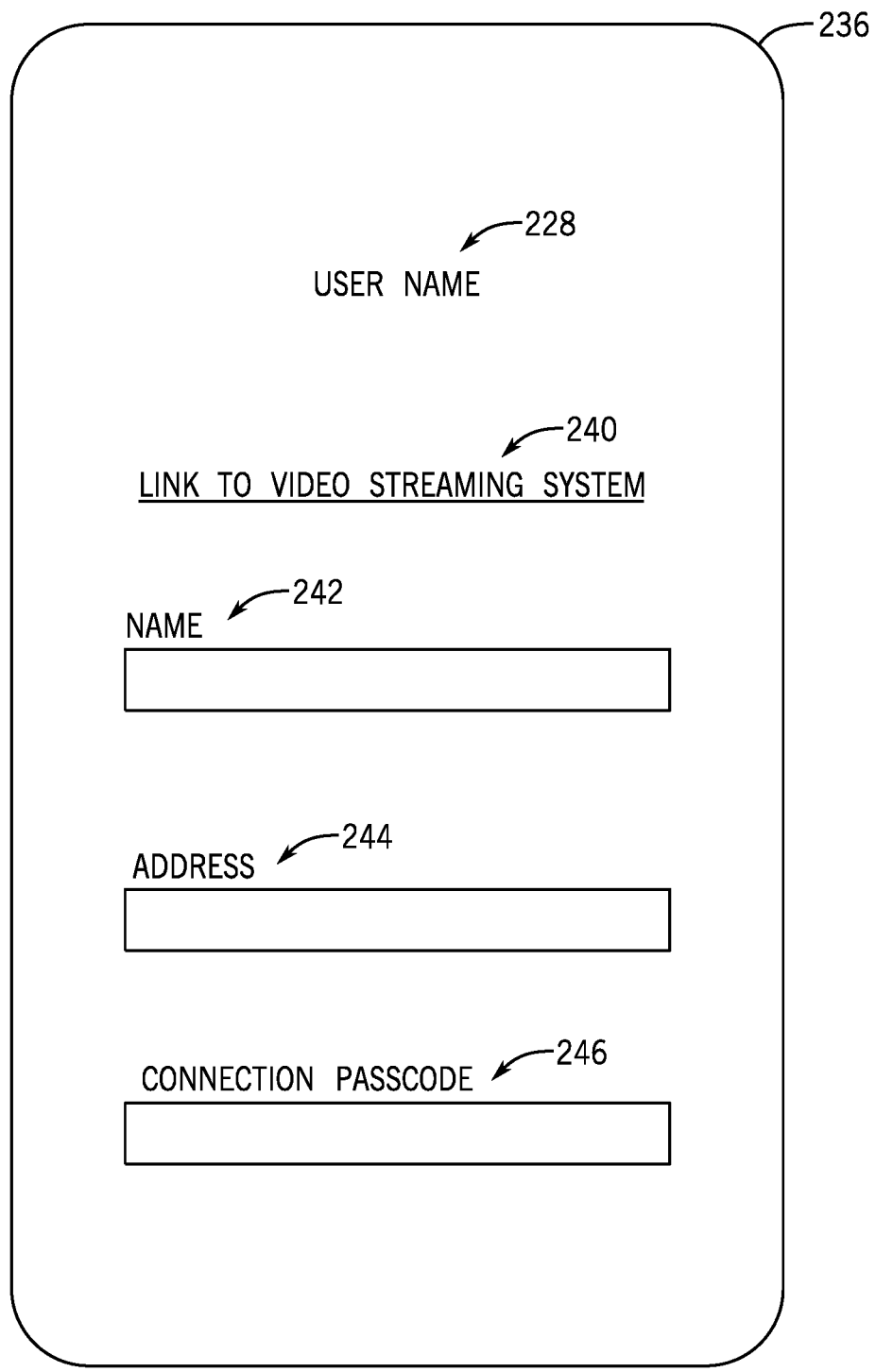
FIG. 8 is a video streaming system linking screen of the user interface of the mobile application for use with the video streaming system of FIGS. 3 and 4, according to an embodiment of the invention.

Referring now to FIG. 8, a video streaming system linking screen 236 of the user interface of the mobile application is shown, according to an embodiment of the invention. Choosing this option to manually link to video streaming systems 234 on video streaming system monitoring screen 226 will direct the user to video streaming system linking screen 236. Video streaming system linking screen 236 will generally shows user name 228, that the user can link to a video streaming system 240, and enter information for connecting to a video streaming system such as, for example, a name 242 of the video streaming system, an address 244 for the video streaming system, and a connection passcode 246 of the video streaming system. This connection information will generally be provided to the user by owner of the video streaming system.

Figure 9:
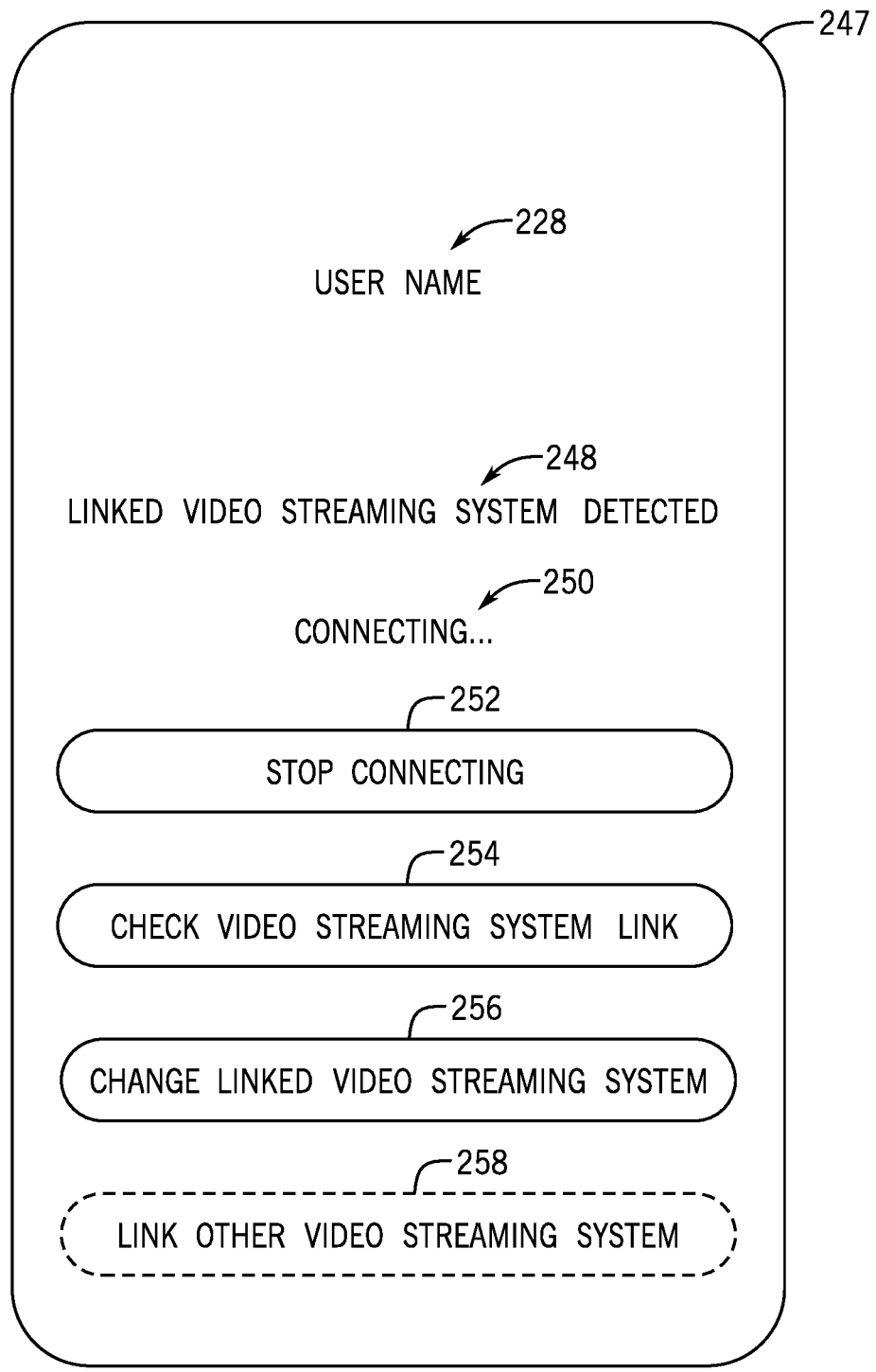
FIG. 9 is a video streaming system connecting screen of the user interface of the mobile application for use with the video streaming system of FIGS. 3 and 4, according to an embodiment of the invention.

Referring now to FIG. 9, a video streaming system connecting screen 247 of the user interface of the mobile application is shown, according to an embodiment of the invention. Video streaming system connecting screen 247 is triggered when the video steaming application detects a video streaming system in range. Video streaming system connecting screen 247 displays user name 228, the linked video streaming system detected 248, and the status that is the video streaming application is attempting to connect 250 to the linked video streaming system. The user also has the option to stop connecting 252, check the video streaming system link 254 to determine if the correct information is input into the video streaming application, and to change to a different linked video streaming system 256, when available. Video streaming system connecting screen 247 may optionally include a selection to link to another video streaming system 258, which would take the user to video streaming system linking screen 236 of FIG. 8.

Figure 10:
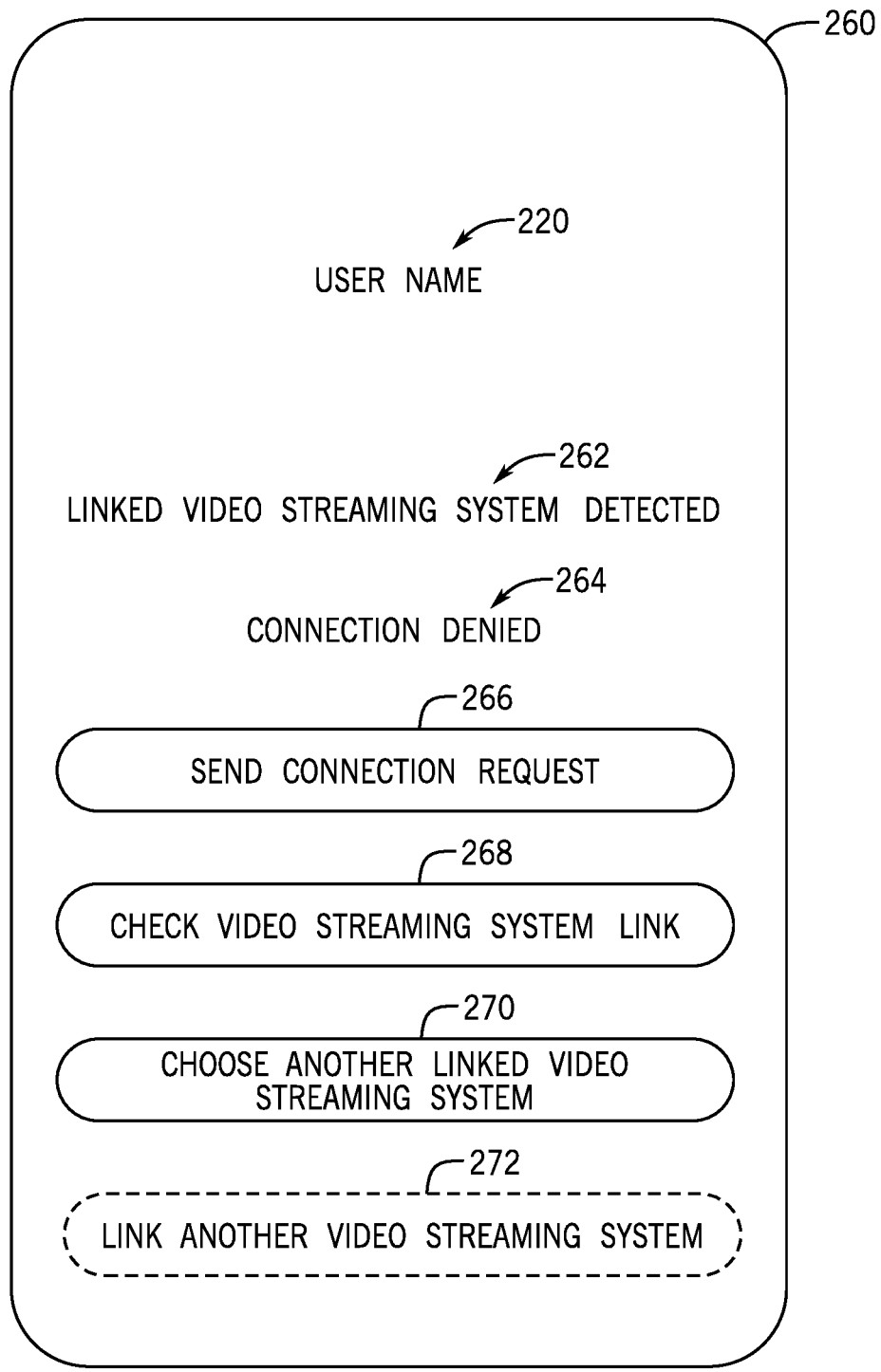
FIG. 10 is a video streaming system connection denied screen of the user interface of the mobile application for use with the video streaming system of FIGS. 3 and 4, according to an embodiment of the invention.

Referring now to FIG. 10, a video streaming system connection denied screen 260 of the user interface of the mobile application is shown, according to an embodiment of the invention. Video streaming system connection denied screen 260 displays user name 228, the linked video streaming system detected 262, and the status that is the connection request was denied 264. The user also has the option to send a new connection request 266, check the video streaming system link 266 to determine if the correct information is input into the video streaming application, and to change to a different linked video streaming system 270, when available. Video streaming system connection denied screen 260 may optionally include a selection to link to another video streaming system 272, which would take the user to video streaming system linking screen 236 of FIG. 8.

Figure 11:
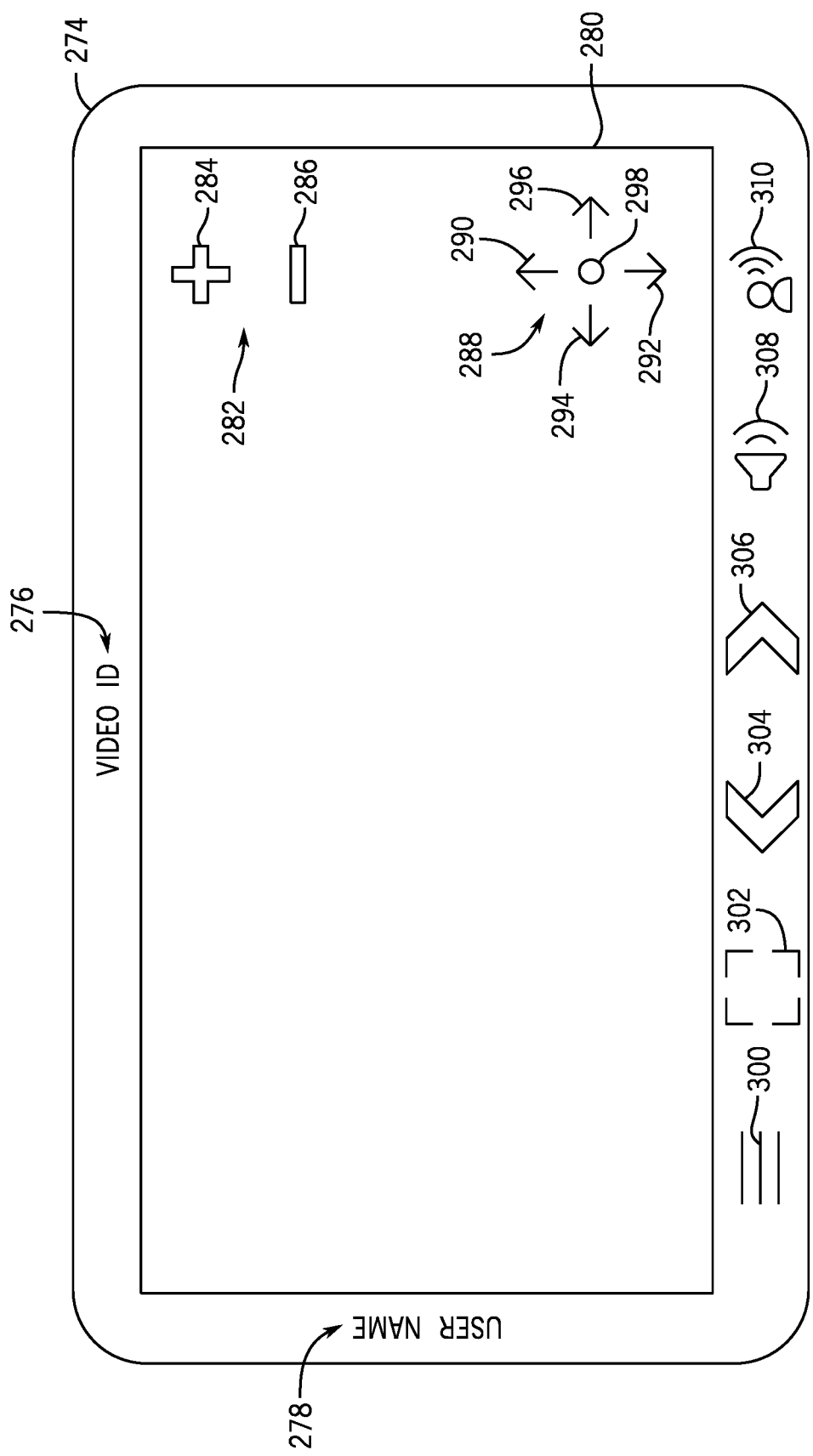
FIG. 11 is a video streaming screen of the user interface of the mobile application for use with the video streaming system of FIGS. 3 and 4, according to an embodiment of the invention.

Referring now to FIG. 11, a video streaming screen 274 of the user interface of the mobile application is shown, according to an embodiment of the invention. Video streaming screen 274 generally displays the video identification (ID) number 276 for the relevant live video feed from the linked video streaming system, the user name 278, and a live video feed 280 from the linked video streaming system. Over live video feed 280, the user may have options to change the zoom 282 of the relevant camera of the linked video streaming system with a plus sign 284 to increase the zoom 282 and a minus sign 286 to decrease the zoom 282. The user may also adjust the view of the relevant camera via a virtual directional pad 188 including up, down, left, and right arrows 290, 292, 294, 296 and a central bubble 298 to move toward arrows 290, 292, 294, 296. However, in some embodiments, these camera zoom and position options are located off of live video feed 280. Moreover, in some cases, adjusting the zoom and position of the relevant camera may only be available to owners.

Video streaming screen 274 also includes a series of buttons below live video feed 280. These buttons include a menu button 300, a full screen button 302, arrow buttons 304, 306, a mute button 308, and a speak button 310. Menu button 300 will open a menu screen 312, which will be described further with respect to FIG. 12. Full screen button 302 allows users and/or owners to have the live video feed take up the full screen on the mobile device rather than only part of screen. Arrow buttons 304, 306 are available when the linked video streaming system includes multiple cameras. Arrow buttons 304, 306 allow users and/or owners to switch between the different cameras in the live video feed. Mute button 308 allows users and/or owners to mute the audio connection from other users and/or owners. That is, the users and/or owners will no longer hear anyone else talking over the audio connection established via the wireless network.

Speak button 310 may have different configurations in different embodiments. As one non-limiting example, speak button 310 is active by default, and the users and/or owners will automatically be able to converse with all other users and/or owners on the audio connection. As another non-limiting example, speakers button 310 is muted by default, and users and/or owners need to press speak button 310 to activate the ability to converse with other connected users and/or owners. As yet another non-limiting example, users and/or owners must press and hold speak button 310 to activate the ability to converse with other connected users and/or owners, and removing pressure from speak button 310 will deactivate the ability to converse with other users and/or owners. With respect to this last example, in some embodiments, pressing and holding speak button 310 will only allow one connected user or owner to speak at a time. That is, if a first connected user or owner is pressing and holding speak button 310 and a second connected user or owner attempts to press and hold speak button 310 at the same time as the first connected user or owner, the second connected user or owner will not be able to speak over the audio connection and will have to wait until the first connected user or owner removes pressure from speak button 310.

Figure 12:
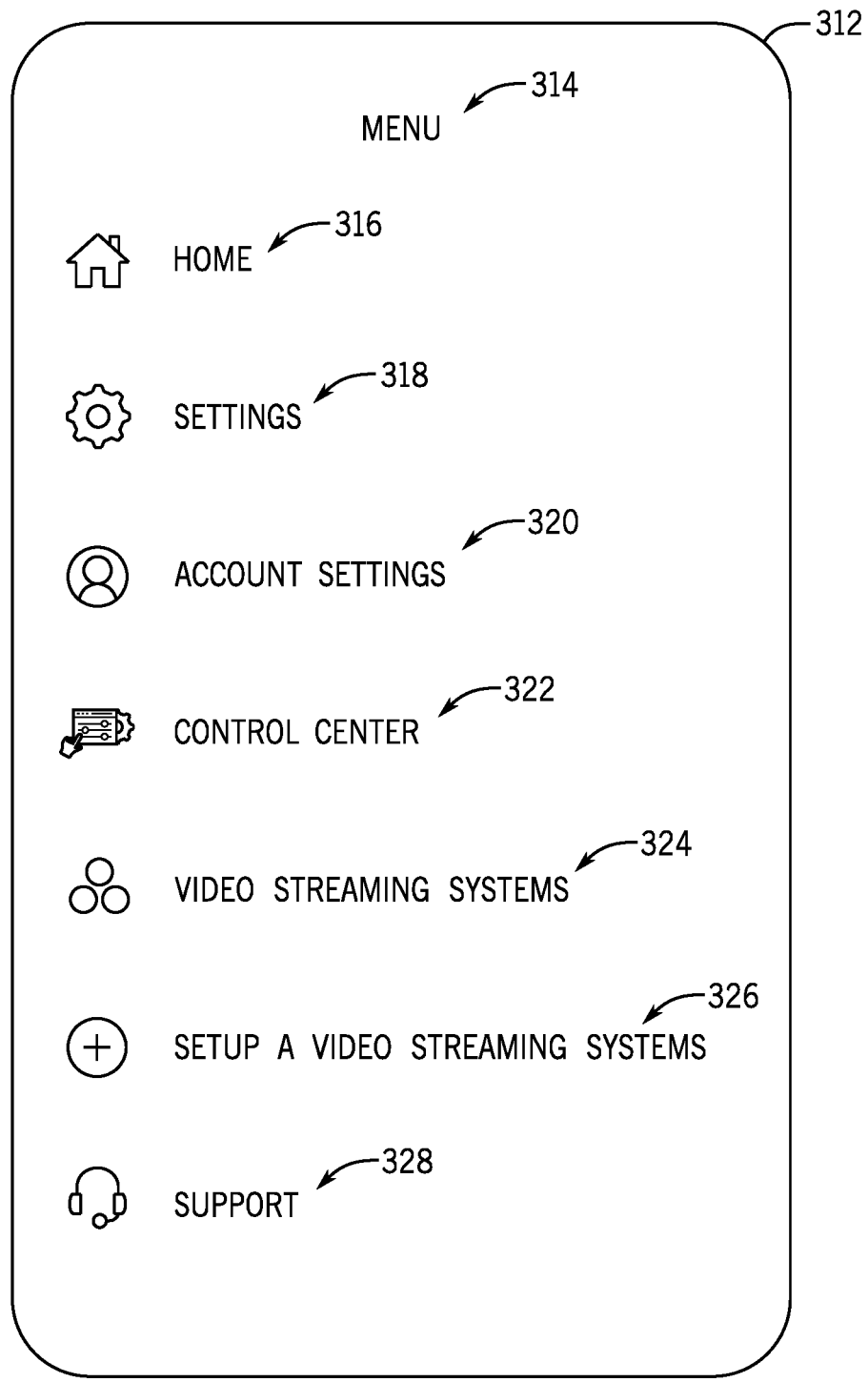
FIG. 12 is a menu screen of the user interface of the mobile application for use with the video streaming system of FIGS. 3 and 4, according to an embodiment of the invention.

Referring now to FIG. 12, menu screen 312 of the user interface of the mobile application is shown, according to an embodiment of the invention. As noted with respect to FIG. 11, menu screen 312 may be accessed through menu button 300 on video streaming screen 274. However, menu button 300 may appear on other screens of the user interface of the video streaming application as well. Menu screen 312 displays that the screen is a menu 314 and includes a home button 316, a settings button 316, an account settings button 320, a control center button 322, a video streaming devices button 324, and setup a video streaming system button 326, and a support button 328. Home button 316 may return users and/or owners to various screens of the user interface of the video streaming application such as, for example, open screen 218, video streaming system monitoring screen 226, video streaming system connecting screen 247, or video streaming system connection denied screen 260. The screen to which home button 316 returns users and/or owners may depend on the connection status with any linked video steaming systems. In some embodiments, the screen to which home button 316 returns users and/or owners may be set by the users and/or owners.

Settings button 318 will allow users and/or owners to change various settings such as, for example, whether the video streaming application has access to the mobile device's location, microphone, speaker, or storage. Account settings button 320 will allow users and/or owners to change their account information such as email address or mailing address. Control center 322 will allow users and/or owners to change default Video streaming systems button 324 will allow users to view a list of available video streaming systems. The list of available video streaming systems may be a list of linked video streaming systems and/or a list of linked video streaming systems in range of the mobile device. The setup a video streaming system button 326 will allow users and/or owners to either link to a new video streaming system or to set up a new video streaming system to which other users and/or owners can link. Support button 328 will allow users and/or owners to view materials intended to aid users and/or owners in configuring the video streaming application and/or video streaming systems. Users and/or owners may also connect with a person who can provide support for using the video streaming application and resolving any issues via a live video or text chat, as non-limiting examples. Users and/or owners may be able to access an artificial intelligence configured to provide assistance as well.

Figure 13:
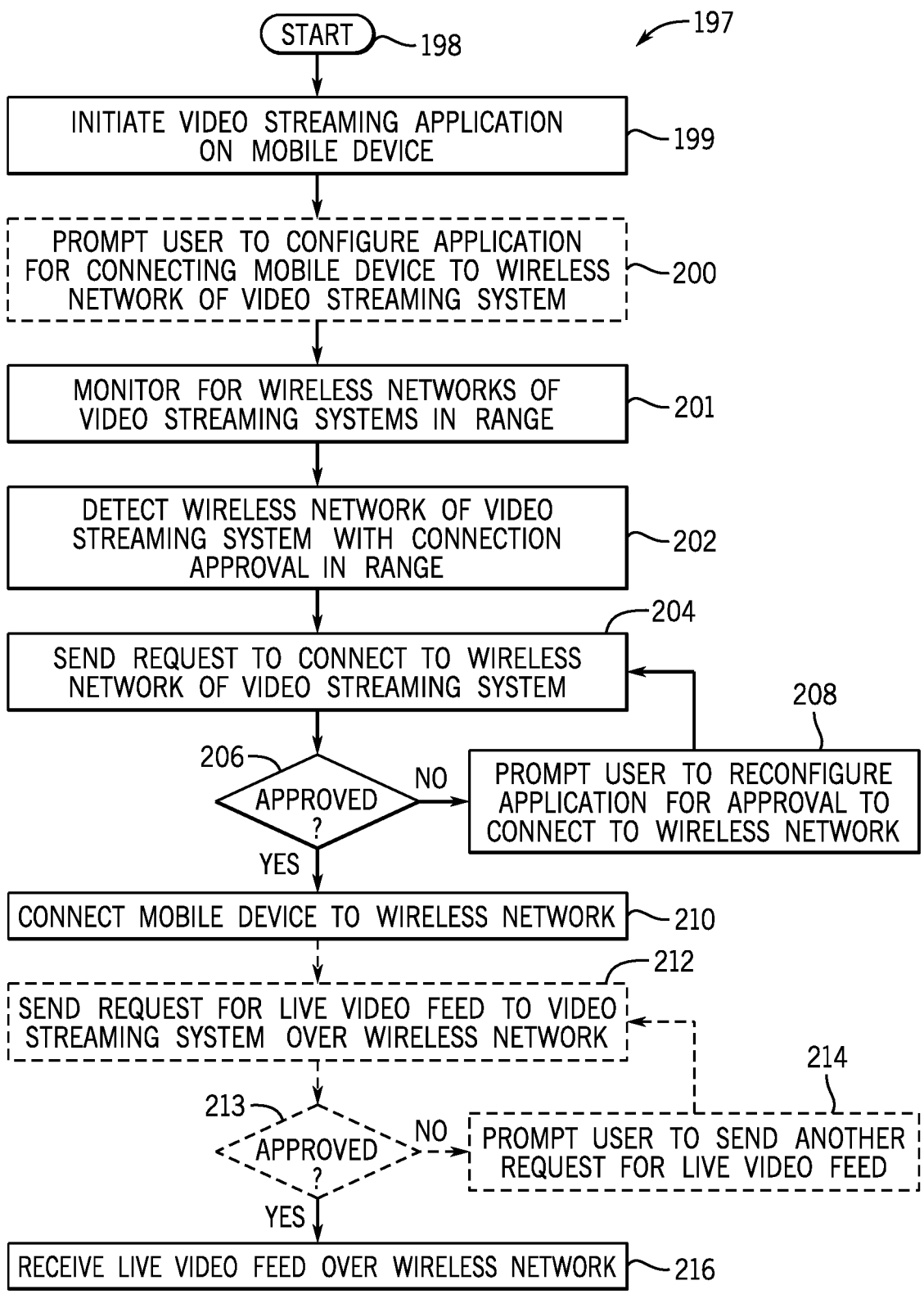
FIG. 13 is a flowchart setting forth exemplary steps of a technique for using the mobile application with the video streaming system of FIGS. 3 and 4, including the screens of FIGS. 6-12, according to an embodiment of the invention.

Referring now to FIG. 13, a flowchart setting forth exemplary steps of a method, process, or technique 197 for using the video streaming application shown in FIGS. 6-12, according to an embodiment of the invention. Reference to FIGS. 6-12 will be made when describing FIG. 13 in order to aid in understanding method 197. Method 197 is performed by a control system (not shown) on a mobile device including the video streaming application. The control system includes one processor configured to individually perform control system functions or a plurality of processors configured to individually and/or collectively perform control system functions. That is, where the control system includes only one processor, that processor is capable of performing all the functions of control system, and where the control system includes more than one processor, those processors may each be configured to perform all the functions of the control system and/or may be configured to perform the functions of the control system collectively.

Method 197 begins at STEP 198 when a user and/or owner powers on the mobile device including the video streaming application. At STEP 199, the control system initiates the video streaming application upon action taken by the user and/or owner or by default after the user and/or owner turns on the mobile device. Once the user and/or owner has created and/or signed into a video streaming application account on open page 218 (FIG. 6), the control system will recognize whether the person signed into the video streaming application is a user and/or an owner and display the proper screens. At STEP 200, once the user and/or owner is signed in, the control system may optionally prompt the user and/or owner in the video streaming application to configure the application to connect the mobile device to a wireless network of a video streaming system such as, for example, wireless network 64 of video streaming system 54 (FIGS. 3 and 4). That is, the control system may prompt the user and/or owner to link a video streaming system to the user's and/or owner's account. Such a prompt may be in the form of link video streaming systems button 234 on video streaming system monitoring screen 226 (FIG. 7), and the user and/or owner may use video streaming system linking screen 236 (FIG. 8) to link a video streaming system to the account.

At STEP 201, once the video streaming application is configured with at least one linked video streaming system, the control system monitors for wireless networks of linked video streaming systems in range. Users and/or owners may view the status of this monitoring on video streaming system monitoring screen 226 (FIG. 7). At STEP 202, the control system detects a wireless network of a linked video streaming system in range. At STEP 204, after detecting the wireless network of the linked video streaming system, the control system sends a request to connect to the linked video streaming system in range. This connection request triggers the control system of the linked video streaming system (for example, control system 76 of video streaming system 54 of FIG. 4) to execute method 118 of FIG. 5. Users and/or owners can view the status of the connection request on video streaming system connecting screen 247 (FIG. 9).

If the connection request is denied at STEP 206, the control system prompts the user and/or owner to reconfigure the application for approval to connect to the wireless network of the linked video streaming system at STEP 208. The prompt from the control system may be in the form of displaying video streaming application connection denied screen 260 (FIG. 10) including check video streaming system link button 268. After the user and/or owner makes a correction or obtains a new approval from an owner of the video streaming system, the user and/or owner may send another connection request using button 266 of video streaming application connection denied screen 260 (FIG. 10).

Returning to STEP 206, if the connection request is approved, the control system connects the mobile device to the wireless network of the linked video streaming system at STEP 210. Thereafter, at STEP 212, the control system may optionally send a request for the live video feed to the linked video streaming system over the wireless network if such a request is required based on the settings for the video streaming system such as, for example, when users require an additional level of approval or permission from an owner to view the live video feed from the video streaming system's video streaming device such as, for example, video streaming device 82 of video streaming system 54.

If the request is denied at STEP 213, the control system will prompt the user and/or to send another request for the live video feed at STEP 214. This second request may come after the user and/or owner reconfigures the account settings in the video streaming application or obtains a new approval from an owner of the video streaming system. Returning to STEP 213, if the request for the live video feed is approved, the control system proceeds to STEP 216. At that time, the control system receives the live video feed over the wireless network of the linked video streaming system and displays the live video feed via the video streaming application. The display of the live video feed may occur via video streaming screen 274.

Beneficially embodiments of the invention thus provide a video streaming system and associated video streaming mobile application. The video streaming system includes a camera, a video streaming device, and a control system. The camera is configured to capture a live video, which the camera sends to the video streaming device. The video streaming device is configured to broadcast a wireless network to which authorized mobile devices can connect and receive a live video feed including the captured live video from the camera. The video streaming device is also configured to establish an audio connection between various users and/or owners connected to the wireless network. The control system is configured to operate the video streaming system, including determining whether mobile devices are authorized to connect to the wireless network, receive the live video feed, and participate in communications via the audio connection. Users and/or owners of the live video streaming system may use the video streaming application to configure their mobile devices to connect to the wireless network and receive the live video feed. The video streaming system and video streaming application provide improved safety, efficiency, and productivity to various operations by providing users and/or owners with a better view of the operation and the ability to communication with each other during the operation to ensure that the operation runs smoothly.

One skilled in the art will appreciate that embodiments of the invention may be interfaced to and controlled by a computer readable storage medium having stored thereon a computer program. The computer readable storage medium may include a plurality of components such as, for example, one or more of electronic components, hardware components, and/or computer software components. These components may include one or more computer readable storage media that generally store instructions such as software, firmware, and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not listed may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media, such as a carrier wave, may be employed to embody a computer data signal representing a sequence of instructions that, when executed by one or more computers, causes the one or more computers to perform one or more portions of one or more implementations or embodiments of a sequence.

Therefore, according to one embodiment of the invention, a video streaming system includes a first camera configured to capture a live video. The video streaming system also includes a video streaming device having one or more transmitters, one or more receivers, and/or one or more transceivers. The video streaming device is configured to broadcast, via at least one transmitter of the one or more transmitters and/or at least one transceiver of the one or more transceivers, a wireless network; receive the live video captured by the first camera; and transmit, via at least one transmitter of the one or more transmitters and/or at least one transceiver of the one or more transceivers, a live video feed over the wireless network. The live video feed includes the live video captured by the first camera. The video streaming system additionally includes a control system having one processor configured to individually perform control system functions or a plurality of processors configured to individually and/or collectively perform control system functions. The control system is configured to receive, from a first mobile device in range of the wireless network, a first request to connect to the wireless network; identify the first mobile device and/or a user of the first mobile device based on the first request; and upon identifying the first mobile device and/or the user of the first mobile device, determine whether the first mobile device and/or the user of the first mobile device is authorized to connect to the wireless network. The control system is further configured to, upon determining that the first mobile device and/or the user of the first mobile device is authorized to connect to the wireless network, instruct the video streaming device to connect the first mobile device to the wireless network and transmit, via at least one transmitter of the one or more transmitters and/or at least one transceiver of the one or more transceivers, the live video feed to the first mobile device.

According to another embodiment of the present invention, a method of transmitting a live video feed via a video streaming system includes capturing live video via at least one camera and broadcasting a wireless network via at least one transmitter of one or more transmitters and/or at least one transceiver of one or more transceivers of a video streaming device. The method also includes receiving, at a control system comprising one processor configured to individually perform control system functions or a plurality of processors configured to individually and/or collectively perform control system functions, a first request to connect to the wireless network from a first mobile device in range of the wireless network. In addition, the method includes identifying, via the control system, the first mobile device and/or a user of the first mobile device based on the first request and, upon identifying the first mobile device and/or the user of the first mobile device, determining, via the control system, whether the first mobile device and/or the user of the first mobile device is authorized to connect to the wireless network. Furthermore, the method includes, upon determining that the first mobile device and/or the user of the first mobile device is authorized to connect to the wireless network, instructing, via the control system, the video streaming device to connect the first mobile device to the wireless network and transmit, via at least one transmitter of the one or more transmitters and/or at least one transceiver of the one or more transceivers, a live video feed comprising the live video captured by the at least one camera to the first mobile device.

According to yet another embodiment of the present invention, a control system for a video streaming system includes one processor configured to individually perform control system functions or a plurality of processors configured to individually and/or collectively perform control system functions. The control system is configured to receive a first request to connect to the wireless network from a first mobile device in range of a wireless network broadcast by a video streaming device of the video streaming system; identify the first mobile device and/or a user of the first mobile device based on the first request; upon identifying the first mobile device and/or the user of the first mobile device, determine whether the first mobile device and/or the user of the first mobile device is authorized to connect to the wireless network; and upon determining that the first mobile device and/or the user of the first mobile device is authorized to connect to the wireless network, instruct the video streaming device to connect the first mobile device to the wireless network and transmit a live video feed to the first mobile device, the live video feed comprising live video from at least one camera of the video streaming system.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. In the appended claims, the singular forms of "a," "an," and "the" include their corresponding plural references unless the context clearly dictates otherwise.

What is claimed is:

1. A video streaming system comprising:
   a first camera configured to capture a live video;
   a video streaming device comprising one or more transmitters, one or more receivers, and/or one or more transceivers, the video streaming device configured to:
      broadcast, via at least one transmitter of the one or more transmitters and/or at least one transceiver of the one or more transceivers, a wireless network;
      receive the live video captured by the first camera; and
      transmit, via at least one transmitter of the one or more transmitters and/or at least one transceiver of the one or more transceivers, a live video feed over the wireless network, the live video feed comprising the live video captured by the first camera;
   a control system comprising one processor configured to individually perform control system functions or a plurality of processors configured to individually and/or collectively perform control system functions, the control system configured to:
      receive, from a first mobile device in range of the wireless network, a first request to connect to the wireless network;
      identify the first mobile device and/or a user of the first mobile device based on the first request;
      upon identifying the first mobile device and/or the user of the first mobile device, determine whether the first mobile device and/or the user of the first mobile device is authorized to connect to the wireless network;
      upon determining that the first mobile device and/or the user of the first mobile device is authorized to connect to the wireless network, instruct the video streaming device to connect the first mobile device to the wireless network;
      determine whether the first mobile device is within a predefined distance of the video streaming system;
      upon determining that the first mobile device is within the predefined distance of the video streaming system, instruct the video streaming device to transmit, via at least one transmitter of the one or more transmitters and/or at least one transceiver of the one or more transceivers, the live video feed to the first mobile device;

upon determining that the first mobile device is not within the predefined distance of the video streaming system, determine whether the first mobile device is still within range of the wireless network; and upon determining that the first mobile device is still within range of the wireless network, delay instructing the video streaming device to transmit the live video feed to the first mobile device until the first mobile device is within the predefined distance of the video streaming system.

2. The video streaming system of claim 1 further comprising a second camera configured to capture a live video;
wherein the video streaming device is configured to:
receive the live video captured by the second camera; and
transmit, via at least one transmitter of the one or more transmitters and/or at least one transceiver of the one or more transceivers, the live video feed over the wireless network, the live video feed further comprising the live video captured by the second camera.

3. The video streaming system of claim 1 wherein the control system is configured to determine whether the first mobile device and/or the user of the first mobile device is authorized to connect to the wireless network by comparing:
the identity of the first mobile device to a list of all mobile devices authorized to connect to the wireless network;
the identity of the user of the first mobile device to a list of all users authorized to connect to the wireless network; and/or
the identity of the first mobile device and/or the identity of the user of the first mobile device to a list of all mobile devices and users authorized to connect to the wireless network.

4. The video streaming system of claim 1 wherein the control system is further configured to:
determine whether the first mobile device and/or the user of the first mobile device is authorized to receive the live video feed from the video streaming device prior to instructing the video streaming device to transmit the live video feed to the first mobile device; and
instruct the video streaming device to transmit the live video feed to the first mobile device upon determining that the first mobile device and/or the user of the first mobile device is authorized to receive the live video feed from the video streaming device.

5. The video streaming system of claim 1 wherein the one processor or at least one processor of the plurality of processors of the control system is integrated into the first camera or the video streaming system.

6. The video streaming system of claim 1 wherein the control system is further configured to:
while the first mobile device is connected to the wireless network, determine whether the first mobile device and/or the user of the first mobile device is still authorized to connect to the wireless network; and
upon determining that authorization for the first mobile device and/or the user of the first mobile device to connect to the wireless network has been withdrawn, instruct the video streaming device to disconnect the first mobile device from the wireless network.

7. The video streaming system of claim 1 wherein the control system configured to determine whether the first mobile device is within a predefined distance of the video streaming system via geofencing, a strength of the connection between the first mobile device and the wireless network, and/or location data from the first mobile device.

8. The video streaming system of claim 1 wherein the predefined distance is measured from the first camera or the video streaming device.

9. The video streaming system of claim 1 further comprising:
a video encoder configured to:
receive the live video from the first camera;
compress the live video from the first camera into a compressed live video; and
provide the compressed live video to the video streaming device;
wherein the video streaming device is configured to transmit the live video feed as a compressed live video feed comprising the compressed live video from the video encoder.

10. The video streaming system of claim 1 wherein the control system is further configured to:
receive, from a second mobile device in range of the wireless network, a second request to connect to the wireless network;
identify the second mobile device and/or a user of the second mobile device based on the second request;
upon identifying the second mobile device and/or the user of the second mobile device, determine whether the second mobile device and/or the user of the second mobile device is authorized to connect to the wireless network;
upon determining that the second mobile device and/or the user of the second mobile device is authorized to connect to the wireless network, instruct the video streaming device to:
connect the second mobile device to the wireless network; and
transmit, via at least one transmitter of the one or more transmitters and/or at least one transceiver of the one or more transceivers, the live video feed to the second mobile device.

11. The video streaming system of claim 10 wherein the control system is further configured to instruct the video streaming device to establish an audio connection between the first and second mobile devices over the wireless network to provide for audio communication between the users of the first and second mobile devices.

12. A method of transmitting a live video feed via a video streaming system, the method comprising:
capturing live video via at least one camera;
broadcasting a wireless network via at least one transmitter of one or more transmitters and/or at least one transceiver of one or more transceivers of a video streaming device;
receiving, at a control system comprising one processor configured to individually perform control system functions or a plurality of processors configured to individually and/or collectively perform control system functions, a first request to connect to the wireless network from a first mobile device in range of the wireless network;
identifying, via the control system, the first mobile device and/or a user of the first mobile device based on the first request;
upon identifying the first mobile device and/or the user of the first mobile device, determining, via the control system, whether the first mobile device and/or the user of the first mobile device is authorized to connect to the wireless network;
upon determining that the first mobile device and/or the user of the first mobile device is authorized to connect to the wireless network, instructing, via the control system, the video streaming device to connect the first mobile device to the wireless network;

determining, via the control system, whether the first mobile device is within a predefined distance of the video streaming system;

upon determining that the first mobile device is within the predefined distance of the video streaming system, instructing, via the control system, the video streaming device to transmit, via at least one transmitter of the one or more transmitters and/or at least one transceiver of the one or more transceivers, a live video feed comprising the live video captured by the at least one camera to the first mobile device;

upon determining that the first mobile device is not within the predefined distance of the video streaming system, determining, via the control system, whether the first mobile device is still within range of the wireless network; and upon determining that the first mobile device is still within range of the wireless network, delaying, via the control system, instructing the video streaming device to transmit the live video feed to the first mobile device until the first mobile device is within the predefined distance of the video streaming system.

13. The method of claim 12 further comprising:

receiving, at the control system, a second request to connect to the wireless network from a second mobile device in range of the wireless network;

identifying, via the control system, the second mobile device and/or a user of the second mobile device based on the second request;

upon identifying the second mobile device and/or the user of the second mobile device, determining, via the control system, whether the second mobile device and/or the user of the second mobile device is authorized to connect to the wireless network;

upon determining that the second mobile device and/or the user of the second mobile device is authorized to connect to the wireless network, instructing, via the control system, the video streaming device to:

connect the second mobile device to the wireless network; and transmit, via at least one transmitter of the one or more transmitters and/or at least one transceiver of the one or more transceivers, a live video feed comprising the live video captured by the at least one camera to the second mobile device.

14. The method of claim 13 further comprising connecting the first and second mobile devices over the wireless network to provide for audio communication between the users of the first and second mobile devices.

15. The method of claim 12 further comprising:

while the first mobile device is connected to the wireless network, determining, via the control system, whether the first mobile device is w is still authorized to connect to the wireless network; and upon determining that authorization for the first mobile device and/or the user of the first mobile device to connect to the wireless network has been withdrawn, instructing, via the control system, the video streaming device to disconnect the first mobile device from the wireless network.

16. The method of claim 12 further comprising:

prompting, via the control system, an owner of the video streaming system to approve transmission of the live video feed from the video streaming device to the first mobile device prior to instructing the video streaming device to transmit the live video feed to the first mobile device; and upon receiving approval to transmit the live video feed from the video streaming device to the first mobile device at the control system, instructing, via the control system, the video streaming device to transmit the live video feed to the first mobile device.

17. A control system for a video streaming system, the control system comprising:

one processor configured to individually perform control system functions or a plurality of processors configured to individually and/or collectively perform control system functions;

wherein the control system is configured to:

receive a first request to connect to the wireless network from a first mobile device in range of a wireless network broadcast by a video streaming device of the video streaming system;

identify the first mobile device and/or a user of the first mobile device based on the first request;

upon identifying the first mobile device and/or the user of the first mobile device, determine whether the first mobile device and/or the user of the first mobile device is authorized to connect to the wireless network;

upon determining that the first mobile device and/or the user of the first mobile device is authorized to connect to the wireless network, instruct the video streaming device to connect the first mobile device to the wireless network;

determine whether the first mobile device is within a predefined distance of the video streaming system;

upon determining that the first mobile device is within the predefined distance of the video streaming system, transmit a live video feed to the first mobile device, the live video feed comprising live video from at least one camera of the video streaming system;

upon determining that the first mobile device is not within the predefined distance of the video streaming system, determine whether the first mobile device is still within range of the wireless network; and upon determining that the first mobile device is still within range of the wireless network, delay instructing the video streaming device to transmit the live video feed to the first mobile device until the first mobile device is within the predefined distance of the video streaming system.

18. The control system of claim 17 wherein the control system is further configured to:

receive a second request to connect to the wireless network from a second mobile device in range of the wireless network;

identify the second mobile device and/or a user of the second mobile device based on the second request;

upon identifying the second mobile device and/or the user of the second mobile device, determining whether the second mobile device and/or the user of the second mobile device is authorized to connect to the wireless network;

upon determining that the second mobile device and/or the user of the second mobile device is authorized to connect to the wireless network, instruct the video streaming device to:

connect the second mobile device to the wireless network; and transmit the live video feed to the second mobile device.

19. The control system of claim 17 wherein the control system is further configured to:
   while the first mobile device is connected to the wireless network, determine whether the first mobile device and/or the user of the first mobile device is still authorized to connect to the wireless network; and
   upon determining that authorization for the first mobile device and/or the user of the first mobile device to connect to the wireless network has been withdrawn, instruct the video streaming device to disconnect the first mobile device from the wireless network.

20. The control system of claim 17 wherein the control system is further configured to:
   prompt an owner of the video streaming system to approve transmission of the live video feed from the video streaming device to the first mobile device prior to instructing the video streaming device to transmit the live video feed to the first mobile device; and
   upon receiving approval to transmit the live video feed from the video streaming device to the first mobile device, instruct the video streaming device to transmit the live video feed to the first mobile device.

* * * * *